US008662449B2

(12) United States Patent
Shah et al.

(10) Patent No.: US 8,662,449 B2
(45) Date of Patent: Mar. 4, 2014

(54) CNT-TAILORED COMPOSITE AIR-BASED STRUCTURES

(75) Inventors: Tushar K. Shah, Columbia, MD (US); Mark R. Alberding, Glen Arm, MD (US); Harry C. Malecki, Abingdon, MD (US); Samuel J. Markkula, Rising Sun, MD (US); John Anthony Hughes, Aberdeen, MD (US); Shawn C. Kline, Washington, DC (US)

(73) Assignee: Applied NanoStructured Solutions, LLC, Baltimore, MD (US)

( * ) Notice: Subject to any disclaimer, the term of this patent is extended or adjusted under 35 U.S.C. 154(b) by 399 days.

(21) Appl. No.: 12/953,425

(22) Filed: Nov. 23, 2010

(65) Prior Publication Data
US 2011/0133031 A1    Jun. 9, 2011

Related U.S. Application Data

(60) Provisional application No. 61/263,807, filed on Nov. 23, 2009, provisional application No. 61/286,340, filed on Dec. 14, 2009.

(51) Int. Cl.
*B64C 1/00*    (2006.01)
(52) U.S. Cl.
USPC ............................ 244/121; 244/133; 244/119
(58) Field of Classification Search
USPC ................................ 244/1 A, 133, 123.1, 119
See application file for complete search history.

(56) References Cited

U.S. PATENT DOCUMENTS

| 2,412,707 | A | 12/1946 | Barnett |
| 3,304,855 | A | 2/1967 | Oebell |
| 3,584,758 | A | 6/1971 | Moore |
| 4,104,083 | A | 8/1978 | Hirano |
| 4,515,107 | A | 5/1985 | Fournier et al. |
| 4,530,750 | A | 7/1985 | Alsenberg et al. |
| 4,566,969 | A | 1/1986 | Klein |
| 4,707,349 | A | 11/1987 | Hjersted |
| 4,728,399 | A | 3/1988 | Moehwald |
| 4,837,073 | A | 6/1989 | McAllister et al. |
| 4,894,293 | A | 1/1990 | Breit et al. |
| 4,920,917 | A | 5/1990 | Nakatani et al. |
| 4,976,899 | A | 12/1990 | Rousseau et al. |
| 5,093,155 | A | 3/1992 | Miyazaki et al. |
| 5,130,194 | A | 7/1992 | Baker et al. |
| 5,156,225 | A | 10/1992 | Murrin |

(Continued)

FOREIGN PATENT DOCUMENTS

CN    101698975       4/2008
CN    101173386 A     5/2008

(Continued)

OTHER PUBLICATIONS

U.S. Appl. No. 12/766,817, filed Apr. 23, 2010, Tushar K. Shah.

(Continued)

*Primary Examiner* — Tien Dinh
*Assistant Examiner* — Justin Benedik
(74) *Attorney, Agent, or Firm* — McDermott Will & Emery LLP

(57) ABSTRACT

An apparatus having a composite air-based structure with a first carbon nanotube infused material and a second carbon nanotube infused material. The first and second carbon nanotube infused materials each having a range of carbon nanotube loading selected to provide different functionalities.

24 Claims, 9 Drawing Sheets

(56) References Cited

U.S. PATENT DOCUMENTS

| | | |
|---|---|---|
| 5,173,367 A | 12/1992 | Liimatta et al. |
| 5,221,605 A | 6/1993 | Bard et al. |
| 5,223,353 A | 6/1993 | Ohsawa et al. |
| 5,225,265 A * | 7/1993 | Prandy et al. .................. 428/138 |
| 5,227,238 A | 7/1993 | Hirai et al. |
| 5,238,808 A | 8/1993 | Bard et al. |
| 5,246,794 A | 9/1993 | Blomgren et al. |
| 5,310,687 A | 5/1994 | Bard et al. |
| 5,370,921 A * | 12/1994 | Cedarleaf ...................... 428/138 |
| 5,470,408 A | 11/1995 | Nielson et al. |
| 5,514,217 A | 5/1996 | Niino et al. |
| 5,547,525 A | 8/1996 | Bennett et al. |
| 5,571,749 A | 11/1996 | Matsuda et al. |
| 5,639,984 A | 6/1997 | Nielson |
| 5,714,089 A | 2/1998 | Bard et al. |
| 5,731,147 A | 3/1998 | Bard et al. |
| 5,744,075 A | 4/1998 | Klett et al. |
| 5,908,585 A | 6/1999 | Shibuta |
| 5,968,274 A | 10/1999 | Fujioka et al. |
| 5,997,832 A | 12/1999 | Lieber et al. |
| 6,140,138 A | 10/2000 | Bard et al. |
| 6,146,783 A | 11/2000 | Brohm et al. |
| 6,184,280 B1 | 2/2001 | Shibuta |
| 6,221,154 B1 | 4/2001 | Lee et al. |
| 6,232,706 B1 | 5/2001 | Dai et al. |
| 6,251,520 B1 | 6/2001 | Blizzard et al. |
| 6,265,466 B1 * | 7/2001 | Glatkowski et al. .......... 523/137 |
| 6,331,209 B1 | 12/2001 | Jang et al. |
| 6,333,016 B1 | 12/2001 | Resasco et al. |
| 6,361,861 B2 | 3/2002 | Gao et al. |
| 6,382,120 B1 | 5/2002 | Keire |
| 6,413,487 B1 | 7/2002 | Resasco et al. |
| 6,420,293 B1 | 7/2002 | Chang et al. |
| 6,455,021 B1 | 9/2002 | Saito |
| 6,465,057 B1 | 10/2002 | Nakahigashi et al. |
| 6,479,028 B1 | 11/2002 | Kaner et al. |
| 6,479,030 B1 | 11/2002 | Firsich |
| 6,491,789 B2 | 12/2002 | Niu |
| 6,495,258 B1 | 12/2002 | Chen et al. |
| 6,528,572 B1 | 3/2003 | Patel et al. |
| 6,564,744 B2 | 5/2003 | Nakahigashi et al. |
| 6,653,619 B2 | 11/2003 | Chin et al. |
| 6,673,392 B2 | 1/2004 | Lee et al. |
| 6,692,717 B1 | 2/2004 | Smalley et al. |
| 6,699,525 B2 | 3/2004 | Jayatissa |
| 6,762,237 B2 | 7/2004 | Glatkowski et al. |
| 6,765,949 B2 | 7/2004 | Chang |
| 6,790,425 B1 | 9/2004 | Smalley et al. |
| 6,818,821 B2 | 11/2004 | Fujieda et al. |
| 6,837,928 B1 | 1/2005 | Zhang et al. |
| 6,852,410 B2 | 2/2005 | Veedu et al. |
| 6,863,942 B2 | 3/2005 | Ren et al. |
| 6,887,451 B2 | 5/2005 | Dodelet et al. |
| 6,900,264 B2 | 5/2005 | Kumar et al. |
| 6,900,580 B2 | 5/2005 | Dai et al. |
| 6,908,572 B1 | 6/2005 | Derbyshire et al. |
| 6,913,075 B1 | 7/2005 | Knowles et al. |
| 6,921,575 B2 | 7/2005 | Horiuchi et al. |
| 6,934,600 B2 | 8/2005 | Jang et al. |
| 6,936,653 B2 | 8/2005 | McElrath et al. |
| 6,955,800 B2 | 10/2005 | Resasco et al. |
| 6,962,892 B2 | 11/2005 | Resasco et al. |
| 6,967,013 B2 | 11/2005 | Someya et al. |
| 6,979,709 B2 | 12/2005 | Smalley et al. |
| 6,986,853 B2 * | 1/2006 | Glatkowski et al. ....... 264/36.19 |
| 6,986,877 B2 | 1/2006 | Takikawa et al. |
| 6,994,907 B2 | 2/2006 | Resasco et al. |
| 7,011,760 B2 | 3/2006 | Wang et al. |
| 7,018,600 B2 | 3/2006 | Yanagisawa et al. |
| 7,022,776 B2 | 4/2006 | Bastiaens et al. |
| 7,045,108 B2 | 5/2006 | Jiang et al. |
| 7,056,452 B2 | 6/2006 | Niu et al. |
| 7,074,294 B2 | 7/2006 | Dubrow |
| 7,094,386 B2 | 8/2006 | Resasco et al. |
| 7,105,596 B2 | 9/2006 | Smalley et al. |
| 7,108,841 B2 | 9/2006 | Smalley et al. |
| 7,118,693 B2 | 10/2006 | Glatkowski et al. |
| 7,125,502 B2 | 10/2006 | Smalley et al. |
| 7,125,534 B1 | 10/2006 | Smalley et al. |
| 7,132,621 B2 | 11/2006 | Kumar et al. |
| 7,144,563 B2 | 12/2006 | Rao et al. |
| 7,148,619 B2 | 12/2006 | Ken et al. |
| 7,151,129 B2 | 12/2006 | Ishikawa et al. |
| 7,153,452 B2 | 12/2006 | Ogale et al. |
| 7,157,068 B2 | 1/2007 | Li et al. |
| 7,160,532 B2 | 1/2007 | Liu et al. |
| 7,211,320 B1 | 5/2007 | Cooper et |
| 7,226,643 B2 | 6/2007 | Juang et al. |
| 7,235,159 B2 | 6/2007 | Gu et al. |
| 7,253,442 B2 | 8/2007 | Huang et al. |
| 7,261,779 B2 | 8/2007 | Gardner |
| 7,265,174 B2 | 9/2007 | Carroll et al. |
| 7,265,175 B2 | 9/2007 | Winey et al. |
| 7,278,324 B2 | 10/2007 | Smits et al. |
| 7,285,591 B2 | 10/2007 | Winey et al. |
| 7,294,302 B2 | 11/2007 | Kolde et al. |
| 7,329,698 B2 | 2/2008 | Noguchi et al. |
| 7,338,684 B1 | 3/2008 | Curliss et al. |
| 7,354,881 B2 | 4/2008 | Resasco et al. |
| 7,354,988 B2 | 4/2008 | Charati et al. |
| 7,372,880 B2 | 5/2008 | Jablonski et al. |
| 7,384,663 B2 | 6/2008 | Olry et al. |
| 7,399,794 B2 | 7/2008 | Harmon et al. |
| 7,407,640 B2 | 8/2008 | Barrera et al. |
| 7,407,901 B2 | 8/2008 | Bystricky et al. |
| 7,410,628 B2 | 8/2008 | Bening et al. |
| 7,411,019 B1 | 8/2008 | Bley |
| 7,419,601 B2 | 9/2008 | Cooper et al. |
| 7,431,965 B2 | 10/2008 | Grigorian et al. |
| 7,442,284 B2 | 10/2008 | Ren et al. |
| 7,445,817 B2 | 11/2008 | Kumar et al. |
| 7,448,441 B2 | 11/2008 | Hendricks et al. |
| 7,448,931 B2 | 11/2008 | Liu et al. |
| 7,459,627 B2 | 12/2008 | Lee et al. |
| 7,465,605 B2 | 12/2008 | Raravikar et al. |
| 7,473,466 B1 | 1/2009 | Muradov |
| 7,479,052 B2 | 1/2009 | Kim et al. |
| 7,488,455 B2 | 2/2009 | Dai et al. |
| 7,504,078 B1 | 3/2009 | Jacques et al. |
| 7,510,695 B2 | 3/2009 | Smalley et al. |
| 7,534,486 B2 | 5/2009 | Boerstoel et al. |
| 7,544,415 B2 | 6/2009 | Chen et al. |
| 7,563,411 B2 | 7/2009 | Jiang et al. |
| 7,563,428 B2 | 7/2009 | Resasco et al. |
| 7,569,425 B2 | 8/2009 | Huang et al. |
| 7,588,700 B2 | 9/2009 | Kwon et al. |
| 7,592,248 B2 | 9/2009 | Ventzek et al. |
| 7,597,869 B2 | 10/2009 | Hsiao |
| 7,608,798 B2 | 10/2009 | Kumar et al. |
| 7,611,579 B2 | 11/2009 | Lashmore et al. |
| 7,615,204 B2 | 11/2009 | Ajayan et al. |
| 7,615,205 B2 | 11/2009 | Jiang et al. |
| 7,632,550 B2 | 12/2009 | Mizuno et al. |
| 7,632,569 B2 | 12/2009 | Smalley et al. |
| 7,700,943 B2 | 4/2010 | Raravikar et al. |
| 7,709,087 B2 | 5/2010 | Majidi et al. |
| 7,718,220 B2 | 5/2010 | D'Silva et al. |
| 7,729,100 B2 * | 6/2010 | Llorente Gonzalez et al. ............................ 361/220 |
| 7,771,289 B2 | 8/2010 | Palumbo et al. |
| 7,771,798 B1 | 8/2010 | Grosse et al. |
| 7,776,777 B2 | 8/2010 | Kim et al. |
| 7,811,632 B2 | 10/2010 | Eres |
| 7,815,820 B2 | 10/2010 | Tan et al. |
| 7,816,709 B2 | 10/2010 | Balzano et al. |
| 7,862,795 B2 | 1/2011 | Zhang et al. |
| 7,867,468 B1 | 1/2011 | Haddon et al. |
| 7,867,616 B2 | 1/2011 | Harutyunyan |
| 7,871,591 B2 | 1/2011 | Harutyunyan et al. |
| 7,880,376 B2 | 2/2011 | Takai et al. |
| 7,927,701 B2 | 4/2011 | Curliss et al. |
| 8,048,490 B2 | 11/2011 | Watanabe et al. |
| 2002/0035170 A1 | 3/2002 | Glatkowski et al. |
| 2002/0085968 A1 * | 7/2002 | Smalley et al. ................ 422/198 |

(56) References Cited

U.S. PATENT DOCUMENTS

| | | |
|---|---|---|
| 2002/0090331 A1 | 7/2002 | Smalley et al. |
| 2003/0004058 A1 | 1/2003 | Li et al. |
| 2003/0024884 A1 | 2/2003 | Petrik |
| 2003/0042147 A1 | 3/2003 | Talin et al. |
| 2003/0044678 A1 | 3/2003 | Winarski |
| 2003/0094734 A1 | 5/2003 | Deckard et al. |
| 2003/0102585 A1 | 6/2003 | Poulin et al. |
| 2003/0111333 A1 | 6/2003 | Montgomery et al. |
| 2003/0122111 A1 | 7/2003 | Glatkowski |
| 2003/0166744 A1 | 9/2003 | Van Dijk et al. |
| 2003/0213939 A1 | 11/2003 | Narayan et al. |
| 2004/0007955 A1 | 1/2004 | Yaniv et al. |
| 2004/0026234 A1 | 2/2004 | Vanden Brande et al. |
| 2004/0082247 A1 | 4/2004 | Desai et al. |
| 2004/0105807 A1 | 6/2004 | Fan et al. |
| 2004/0171725 A1 | 9/2004 | Richardson et al. |
| 2004/0184981 A1 | 9/2004 | Liu et al. |
| 2004/0245088 A1 | 12/2004 | Gardner |
| 2004/0253167 A1 | 12/2004 | Silva et al. |
| 2005/0005554 A1 | 1/2005 | Oppermanm |
| 2005/0023727 A1 | 2/2005 | Sampson |
| 2005/0042163 A1 | 2/2005 | Allison et al. |
| 2005/0049355 A1 | 3/2005 | Tang et al. |
| 2005/0062024 A1 | 3/2005 | Bessette et al. |
| 2005/0081752 A1 | 4/2005 | Snyder et al. |
| 2005/0090024 A1 | 4/2005 | Chopra |
| 2005/0090176 A1 | 4/2005 | Dean et al. |
| 2005/0100501 A1 | 5/2005 | Veedu et al. |
| 2005/0112052 A1 | 5/2005 | Gu et al. |
| 2005/0119371 A1 | 6/2005 | Drzal et al. |
| 2005/0172370 A1 | 8/2005 | Haq et al. |
| 2005/0176329 A1 | 8/2005 | Olry et al. |
| 2005/0181209 A1 | 8/2005 | Karandikar |
| 2005/0188727 A1 | 9/2005 | Greywall |
| 2005/0204984 A1 | 9/2005 | Finot |
| 2005/0230560 A1 | 10/2005 | Glatkowski et al. |
| 2005/0260120 A1 | 11/2005 | Smalley et al. |
| 2005/0260412 A1 | 11/2005 | Gardner |
| 2005/0263456 A1 | 12/2005 | Cooper et al. |
| 2005/0284232 A1 | 12/2005 | Rice |
| 2005/0287064 A1 | 12/2005 | Mayne et al. |
| 2006/0002841 A1 | 1/2006 | Chen et al. |
| 2006/0047052 A1 | 3/2006 | Barrera et al. |
| 2006/0052509 A1 | 3/2006 | Saitoh |
| 2006/0057361 A1 | 3/2006 | Ounaies et al. |
| 2006/0060825 A1* | 3/2006 | Glatkowski .................. 252/500 |
| 2006/0065546 A1 | 3/2006 | Curodeau |
| 2006/0078705 A1* | 4/2006 | Glatkowski et al. ............ 428/63 |
| 2006/0099135 A1 | 5/2006 | Yodh et al. |
| 2006/0110599 A1 | 5/2006 | Honma et al. |
| 2006/0118158 A1 | 6/2006 | Zhang et al. |
| 2006/0121275 A1 | 6/2006 | Poulin et al. |
| 2006/0135677 A1* | 6/2006 | Huang et al. .................. 524/496 |
| 2006/0159916 A1 | 7/2006 | Dubrow et al. |
| 2006/0166003 A1* | 7/2006 | Khabashesku et al. ....... 428/413 |
| 2006/0177602 A1 | 8/2006 | Dijon et al. |
| 2006/0198956 A1 | 9/2006 | Eres |
| 2006/0202168 A1* | 9/2006 | Barrera et al. ................ 252/500 |
| 2007/0003817 A1 | 1/2007 | Umeda et al. |
| 2007/0020167 A1 | 1/2007 | Han et al. |
| 2007/0048521 A1 | 3/2007 | Istvan |
| 2007/0054105 A1 | 3/2007 | Hsiao |
| 2007/0087198 A1 | 4/2007 | Dry |
| 2007/0092431 A1 | 4/2007 | Resasco et al. |
| 2007/0110977 A1 | 5/2007 | Al-Haik et al. |
| 2007/0128960 A1 | 6/2007 | Ghasemi Nejhad et al. |
| 2007/0135588 A1 | 6/2007 | Diakoumakos et al. |
| 2007/0153362 A1 | 7/2007 | Gruner |
| 2007/0189953 A1 | 8/2007 | Bai et al. |
| 2007/0231156 A1 | 10/2007 | Hong |
| 2007/0259128 A1 | 11/2007 | Parsapour |
| 2007/0265379 A1 | 11/2007 | Chen et al. |
| 2008/0014431 A1 | 1/2008 | Lashmore et al. |
| 2008/0020193 A1 | 1/2008 | Jang et al. |
| 2008/0025906 A1 | 1/2008 | Lin et al. |
| 2008/0039557 A1 | 2/2008 | Li et al. |
| 2008/0048364 A1 | 2/2008 | Armenlades et al. |
| 2008/0053922 A1 | 3/2008 | Honsinger, Jr. et al. |
| 2008/0073098 A1 | 3/2008 | Gonzalez et al. |
| 2008/0075954 A1 | 3/2008 | Wardle et al. |
| 2008/0118753 A1 | 5/2008 | Poulin et al. |
| 2008/0137890 A1 | 6/2008 | Petersen et al. |
| 2008/0145528 A1* | 6/2008 | Deng et al. .................. 427/180 |
| 2008/0160286 A1 | 7/2008 | Asrar et al. |
| 2008/0170982 A1 | 7/2008 | Zhang et al. |
| 2008/0173111 A1 | 7/2008 | Thostenson et al. |
| 2008/0176987 A1 | 7/2008 | Trevet et al. |
| 2008/0182108 A1 | 7/2008 | Curliss et al. |
| 2008/0187648 A1 | 8/2008 | Hart et al. |
| 2008/0237922 A1 | 10/2008 | Vaidyanathan et al. |
| 2008/0247938 A1 | 10/2008 | Tsai et al. |
| 2008/0248275 A1 | 10/2008 | Jang et al. |
| 2008/0279753 A1 | 11/2008 | Harutyunyan |
| 2008/0286546 A1 | 11/2008 | Lashmore et al. |
| 2008/0286564 A1 | 11/2008 | Tsotsis |
| 2008/0311301 A1 | 12/2008 | Diss et al. |
| 2009/0020734 A1 | 1/2009 | Jang et al. |
| 2009/0047453 A1 | 2/2009 | Folaron et al. |
| 2009/0047502 A1 | 2/2009 | Folaron et al. |
| 2009/0068387 A1 | 3/2009 | Panzer et al. |
| 2009/0068461 A1 | 3/2009 | Reneker et al. |
| 2009/0072222 A1 | 3/2009 | Radisic et al. |
| 2009/0081383 A1 | 3/2009 | Alberding et al. |
| 2009/0081441 A1* | 3/2009 | Shah et al. ................... 428/222 |
| 2009/0088582 A1 | 4/2009 | Inagaki et al. |
| 2009/0092832 A1 | 4/2009 | Moireau |
| 2009/0099016 A1 | 4/2009 | Carruthers et al. |
| 2009/0099276 A1* | 4/2009 | Barrera et al. ................ 522/113 |
| 2009/0117363 A1 | 5/2009 | Wardle et al. |
| 2009/0121219 A1 | 5/2009 | Song et al. |
| 2009/0121727 A1* | 5/2009 | Lynch et al. .................. 324/609 |
| 2009/0126783 A1 | 5/2009 | Lin et al. |
| 2009/0136707 A1 | 5/2009 | Ueno |
| 2009/0140098 A1* | 6/2009 | Lengsfeld et al. ............ 244/121 |
| 2009/0176100 A1 | 7/2009 | Higashi et al. |
| 2009/0176112 A1* | 7/2009 | Kruckenberg et al. ........ 428/457 |
| 2009/0186214 A1* | 7/2009 | Lafdi et al. .................... 428/336 |
| 2009/0191352 A1 | 7/2009 | DuFaux et al. |
| 2009/0192241 A1 | 7/2009 | Raravikar et al. |
| 2009/0212430 A1 | 8/2009 | Wyland |
| 2009/0214800 A1 | 8/2009 | Saito |
| 2009/0220409 A1 | 9/2009 | Curliss et al. |
| 2009/0258164 A1 | 10/2009 | Nakai et al. |
| 2009/0277897 A1* | 11/2009 | Lashmore et al. ............. 219/544 |
| 2009/0282802 A1 | 11/2009 | Cooper et al. |
| 2009/0286079 A1 | 11/2009 | Barker et al. |
| 2009/0294753 A1 | 12/2009 | Hauge et al. |
| 2009/0311166 A1 | 12/2009 | Hart et al. |
| 2010/0000770 A1 | 1/2010 | Gupta et al. |
| 2010/0059243 A1 | 3/2010 | Chang |
| 2010/0074834 A1 | 3/2010 | Kim |
| 2010/0087042 A1 | 4/2010 | Kim et al. |
| 2010/0098931 A1 | 4/2010 | Daniel et al. |
| 2010/0099319 A1 | 4/2010 | Lashmore et al. |
| 2010/0112373 A1 | 5/2010 | Coffey et al. |
| 2010/0143701 A1 | 6/2010 | Zhu et al. |
| 2010/0159240 A1 | 6/2010 | Shah et al. |
| 2010/0178825 A1 | 7/2010 | Shah et al. |
| 2010/0188833 A1 | 7/2010 | Liang et al. |
| 2010/0192851 A1 | 8/2010 | Shah et al. |
| 2010/0196697 A1 | 8/2010 | D'Silva et al. |
| 2010/0197848 A1 | 8/2010 | Verghese et al. |
| 2010/0203328 A1 | 8/2010 | Hochstetter et al. |
| 2010/0206504 A1 | 8/2010 | Akiyama et al. |
| 2010/0210159 A1 | 8/2010 | Zhu |
| 2010/0221424 A1 | 9/2010 | Malecki et al. |
| 2010/0224129 A1 | 9/2010 | Malecki et al. |
| 2010/0227134 A1 | 9/2010 | Shah et al. |
| 2010/0254885 A1 | 10/2010 | Menchhofer et al. |
| 2010/0272891 A1 | 10/2010 | Malecki et al. |
| 2010/0276072 A1 | 11/2010 | Shah et al. |
| 2010/0279569 A1 | 11/2010 | Shah et al. |
| 2010/0311866 A1 | 12/2010 | Huang et al. |
| 2011/0017867 A1* | 1/2011 | Simmons et al. ............. 244/1 A |

(56) References Cited

U.S. PATENT DOCUMENTS

| | | |
|---|---|---|
| 2011/0024409 A1 | 2/2011 | Shah et al. |
| 2011/0024694 A1 | 2/2011 | Shah et al. |
| 2011/0040007 A1 | 2/2011 | Chandrasekhar et al. |
| 2011/0068514 A1 | 3/2011 | Ruiz et al. |
| 2011/0089958 A1 | 4/2011 | Malecki et al. |
| 2011/0123735 A1 | 5/2011 | Shah et al. |
| 2011/0124483 A1 | 5/2011 | Shah et al. |
| 2011/0174519 A1 | 7/2011 | Shah et al. |
| 2011/0186775 A1 | 8/2011 | Shah et al. |
| 2011/0297892 A1 | 12/2011 | Shah et al. |
| 2012/0000691 A1 | 1/2012 | Shah et al. |

FOREIGN PATENT DOCUMENTS

| | | |
|---|---|---|
| CN | 101230145 A | 7/2008 |
| CN | 101365740 A | 2/2009 |
| CN | 101437663 A | 5/2009 |
| CN | 101582302 A | 11/2009 |
| IN | 01900DE2008 A | 3/2010 |
| KR | 100829001 | 5/2008 |
| TW | 200833861 | 8/2008 |
| WO | WO-03/078832 | 9/2003 |
| WO | WO 2003/082733 | 10/2003 |
| WO | WO-2005/05554 A2 | 1/2005 |
| WO | WO 2005/075341 | 8/2005 |
| WO | WO 2006/048531 | 5/2006 |
| WO | WO 2006/115486 | 11/2006 |
| WO | WO 2007/015710 | 2/2007 |
| WO | WO 2007/061854 | 5/2007 |
| WO | WO 2007/063764 | 6/2007 |
| WO | WO 2007/089118 | 8/2007 |
| WO | WO-2007/130979 A2 | 11/2007 |
| WO | WO 2007/149109 | 12/2007 |
| WO | WO 2008/041183 | 4/2008 |
| WO | WO 2008/054541 | 5/2008 |
| WO | WO 2008/085634 | 7/2008 |
| WO | WO-2008085550 A2 | 7/2008 |
| WO | WO 2008/115640 | 9/2008 |
| WO | WO 2009/004346 | 1/2009 |
| WO | WO-2009/007617 A2 | 1/2009 |
| WO | WO-2009/080048 A2 | 7/2009 |
| WO | WO 2009/103925 | 8/2009 |
| WO | WO 2009/110885 | 9/2009 |
| WO | WO 2009/124862 | 10/2009 |
| WO | WO-2010/006807 A2 | 1/2010 |
| WO | WO-2011/053457 | 5/2011 |

OTHER PUBLICATIONS

U.S. Appl. No. 61/295,621, filed Jan. 15, 2010, Harry C. Malecki.

U.S. Appl. No. 61/297,704, filed Jan. 22, 2010, Tushar K. Shah.

Ago, et al., "Colloidal Solution of Metal Nanoparticles as a Catalyst for Carbon Nanotube Growth", Proceedings Materials Research Society, Fall 2000, pp. A13.18.1-A13.18.5, vol. 633, Materials Research Society.

Bradford, et al., "Electrical Conductivity Study of Carbon nanotube Yarns, 3-D Hybrid Braids and their Composites", Jouranl of Composite Materials, pp. 1533-1545, vol. 42, No. 15, SAGE Productions, Los Angeles, London, New Delhi and Singapore.

Bubert, et al., "Basic analytical investigation of plasma-chemically modified carbon fibers", Spectrochimica Acta Part B., 2002, pp. 1601-1610, vol. 57, Elsevier Science B.V.

Chae, et al., "A comparison of reinforcement efficiency of various types of carbon nanotubes in polyacrylonitrile fiber", Polymer, Nov. 21, 2005, pp. 10925-10935, vol. 46, No. 24, Elsevier Ltd.

Che, et al., "Chemical Vapor Deposition Based Synthesis of Carbon Nanotubes and Nanofibers Using a Template Method", Chem. Mater., 1998, pp. 260-267, vol. 10, American Chemical Society.

Chen, et al., "Basalt fiber-epoxy laminates with functionalized multi-walled carbon nanotubes", Composites, Part A, 2009, pp. 1082-1089, vol. 40, Elsevier Ltd.

Chen, et al., "Pulsed electrodeposition of Pt nanoclusters on carbon nanotubes modified carbon materials using diffusion restricting viscous electroyles", Electrochemistry Communications, Jun. 2007, pp. 1348-1354, vol. 9, Elsevier B.V.

Ci, et al., "Direct Growth of Carbon Nanotubes on the Surface of Ceramic Fibers", Carbon, 2005, pp. 883-886, vol. 43, No. 4, Elsevier Ltd.

Garcia, et al., "Aligned Carbon Nanotube Reinforcement of Advanced Composite Ply Interfaces," 49th AIAA/ASCE/AHS/ASC Structures, Structural Dynamics, and Materials Conference, Apr. 7-10, 2008, Schaumburg, IL, MIT, American Institute of Aeronautics and Astronautics, Inc.

Hsu, et al., "Optical Absorption and Thermal Transport of Individual Suspended Carbon Nanotube Bundles", Nano Lett., 2009, pp. 590-594, vol. 9, No. 2, American Chemical Society, Publication Date (Web): Jan. 13, 2009.

Jiang, et al., "Carbon nanotube-coated solid-phase microextraction metal fiber based on sol-gel technique", Journal of Chromatography A., May 29, 2009, pp. 4641-4647, vol. 1216, Elsevier B.V.

Jiang, et al., "Plasma-Enhanced Deposition of Silver Nanoparticles onto Polymer and Metal Surfaces for the Generation of Antimicrobial Characteristics", Journal of Applied_Polymer Science, 2004, pp. 1411-1422, vol. 93, Wiley Periodicals, Inc.

Jung, et al., "Fabrication of radar absorbing structure (RAS) using GFR-nano composite and spring-back compensation of hybrid composite RAS shells", Composite Structures, 2006, pp. 571-576, vol. 75, Elsevier Ltd.

Kim, et al., "Processing, characterization, and modeling of carbon nanotube-reinforced multiscale composites," Composites Science and Technology, 2009, pp. 335,342, vol. 69, Elsevier Ltd.

Kind, et al., "Patterned Films of Nanotubes Using Microcontact Printing of Catalysts", Adv. Mater., 1999, pp. 1285-1289, vol. 11, No. 15, WILEY-VCH Verlag GmbH, D-69469 Weinheim.

Kramer, et al., Constrained Iron Catalysts for Single-Walled Carbon Nanotube Growth?, Langmuir 2005, 21, 8466-8470 [http://pubs.acs.org/dol/abs/10.1021/Ia0506729].

Laachachi, et al., "A chemical method to graft carbon nanotubes onto a carbon fiber", Materials Letters, 2008, pp. 394-397, vol. 62, Elsevier B.V.

Lee, "Syntheses and properties of fluorinated carbon materials", Journal of Fluorine Chemistry, 2007, pp. 392-403, vol. 128, Elsevier B.V.

Lee, et al., "Fabrication and design of multi-layered radar absorbing structures of MWNT-filled glass/epoxy plain-weave composites", Composite Structures, 2006, pp. 397-405, vol. 76, Elsevier Ltd.

Li, et al., "A Miniature glucose/O_biofuel cell with single-walled carbon nanotubes-modified carbon fiber microelectrodes as the substrate", Electrochemistry Communications, Jun. 2008, pp. 851-854, vol. 10, Elsevier B.V.

Li, et al., "Electromagnetic Interference (EMI) Shielding of Single-Walled Carbon Nanotube Epoxy Composites", Nano Lett., 2006, pp. 1141-1145, vol. 6, No. 6, American Chemical Society.

Lux, "PCT Application No. PCT/US2007/086875 Search Report and Written Opinion", May 13, 2008.

Makris, et al., "Carbon Nanotubes Growth and Anchorage to Carbon Fibres", Carbon Nanotubes, 2006, pp. 57-58, vol. 222, Springer, the Netherlands.

Meyyappan, et al., "Carbon nanotube growth by PECVD: a review", Plasma Sources Sci. Technol., 2003, pp. 205-216, vol. 12,IOP Publishing Ltd, UK.

Mylvaganam, "Fabrication and Application of Polymer Composites Comprising Carbon Nanotubes", Recent Pat Nanotechnol., 2007, pp. 59-65, vol. 1, Bentham Science Publishers, Ltd.

Panhuis, et al., "Carbon Nanotube Mediated Reduction in Optical Activity in Polyaniline Composite Materials", J. Phys. Chem. C, 2008, pp. 1441-1445, vol. 112, American Chemical Society.

Pisco, et al., "Hollow fibers integrated with single walled carbon nanotubes: Bandgap modification and chemical sensing capability", Sensors and Actuators B, 2008, pp. 163-170, vol. 129, Elsevier B.V.

Račkauskas "Carbon nanotube growth and use in energy sector", Energetika, 2006, pp. 43-46, vol. 2.

Satishkumar, et al., "Bundles of aligned carbon nanotubes obtained by the pyrolysis of ferrocene-hydrocarbon mixtures: role of the metal nanoparticles produced in situ", Chemical Physics Letters, 1999, pp. 158-162, vol. 307, Elsevier Science B.V.

(56) References Cited

OTHER PUBLICATIONS

Suh, et al., "Highly ordered two-dimensional carbon nanotube arrays", Applied Physics Letters, Oct. 4, 2002, pp. 2047-2049, vol. 75, No. 14, American Institute of Physics.

Thostenson, et al., "Carbon nanotube/carbon fiber hybrid multiscale composites", J. Appl. Phys., 2002, pp. 6034-6037, vol. 91, No. 9, American Institute of Physics.

Wang et al., "Processing and Property Investigation of Single-Walled Carbon Nanotube ISWNT) Buckypapaper/Epoxy Resin Matrix Nanocomposit", Composites Part A: Applied Science and Manufacturing, Oct. 1, 2004, pp. 1225-1232. Publisher: PCT/ Published in : PCT.

Wang, et al., "Penetration depth of atmospheric pressure plasma surface modification into multiple layers of polyester fabrics", Surface and Coatings Technology, 2007, pp. 77-83, vol. 202, Elsevier B.V.

Wichmann, et al., "Glass-fibre-reinforced composites with enhanced mechanical and electrical properties—Benefits and limitations of a nanoparticle modified matrix", Engineering Fracture Mechanics, 2006, pp. 2346-2359, vol. 73, Elisevier Ltd.

Xu, et al., "Bone-Shaped Nanomaterials for Nanocomposite Applications", Nano Lett., 2003, pp. 1135-1139, vol. 3, No. 8, American Chemical Society.

Yabe, et al., Synthesis of well-aligned carbon nanotubes by radio frequency plasma enhanced CVD method, Diamond and Related Materials, 2004, pp. 1292-1295, vol. 13, Elsevier B.V.

Yanagishita, et al., "Carbon Nanotubes with a Triangular Cross-section, Fabricated Using Anodic Porous Alumina as the Temple", Adv. Mater., 204, pp. 429-432, vol. 16, No. 5, WILEY-VCH Verlag GmbH & Co. KGaA, Weinheim.

Yang, et al., "Electrical Conductivity and Electromagnetic Interference Shielding of Multi-walled Carbon Nanotube Filled Polymer Composites" Mater. Res. Soc. Symp. Proc., 2005, pp. HH5.3.1-HH. 5.3.5, vol. 858E, Materials Research Society.

Yeh, et al., "Mechanical properties of phenolic-based nanocomposites reinforced by multi-walled carbon nanotubes and carbon fibers", Composites: Part A, 2008, pp. 677-684, vol. 39, No. 4.

Zhang et al., "Integration and characterization of aligned carbon nanotubes on metal/silicon substrates and effects of water", Applied Surface Science 255 (2009) 5003-5008, entire document.

Zhang, et al., "In situ growth of carbon nanotubes on inorganic fibers with different surface properties," Materials Chemistry and Physics, 2008, pp. 317-321, vol. 107, Science Direct.

Zhao, et al., "Growth of carbon nanotubes on the surface of carbon fibers", Carbon, 2007, pp. 380-383, vol. 46, No. 2, Elsevier Ltd.

Zhao, et al., "The growth of multi-walled carbon nanotubes with different morphologies on carbon fibers", Carbon, 2005, pp. 651-673, vol. 43, Elsevier Ltd.

Zhu, et al., "Carbon nanotube growth on carbon fibers", Diamond and Related Materials, 2003, pp. 1825-1825, vol. 12, Elsevier B.V.

Zhu, et al., "Synthesis of single-walled carbon nanotubes by the vertical floating catalyst method," Chinese Science Bulletin, 2002, pp. 159-162, vol. 47, No. 2.

Vaccarini et al., "Reinforcement of an Epoxy Resin by Single Walled Nanotubes", AIP Conference Proceedings, Nov. 21, 2000, vol. 544, pp. 521-525.

Vaccarini, et al., "Reinforcement of an epoxy resin by single walled nanotubes," AIP Conference Proceedings 2000, <http://dx.doi.org/10/1063/1.1342567>.

* cited by examiner

CNT-TAILORED COMPOSITE AIR-BASED STRUCTURES

This application claims priority from U.S. Provisional Patent Application Nos. 61/263,807, filed Nov. 23, 2009, and 61/286,340, filed Dec. 14, 2009, both of which are incorporated herein by reference in their entirety.

STATEMENT REGARDING FEDERALLY SPONSORED RESEARCH OR DEVELOPMENT

Not applicable.

BACKGROUND AND FIELD OF THE INVENTION

The present invention generally relates to carbon nanotubes (CNTs), and more specifically to CNTs incorporated in composite materials and structures.

Hybrid composites have been used with varying degrees of success. The use of two or three different reinforcements within a composite has been accomplished along with the addition of aggregates and fillers used for various purposes including mechanical strengthening, cost reduction, smoke prevention, chemical resistance, and the like.

Air-based structures are subject to a number of demands on operability and efficiency. Structures housing electrical circuits can be prone to exposure to electromagnetic conduction or electromagnetic radiation, which can impair operation without adequate protection. Structures that are relatively tall as compared to surrounding structures or objects can be prone to lightning strikes, which can severely damage or even destroy the structures without electrical conductivity or added means to carry the electrical load. Minor or reparable structural damage to structures can quickly progress to serious or even complete failure without prompt detection. Ice can form on critical components, altering functionality, or even causing failure, without de-icing. Shear, tensile, and compressive forces at critical locations on structures can cause failure over time without adequate structural integrity. Crack propagation can cause serious or even complete failure, if not prevented when micro-cracks initially form. Variations in temperature or other factors can affect the structure with inadequate thermal conductivity. Structures can experience detection by radar waves without appropriate radar absorbing materials. These and additional demands placed on air-based structures result in difficulty in selecting materials suitable to address each demand.

SUMMARY

In some aspects, embodiments disclosed herein relate to tailored composite materials that include a matrix material and a CNT-infused fiber material having particular functionalities.

In some aspects, embodiments disclosed herein relate to an apparatus including a structure supported by air having a composite structure having at least (1) a first carbon nanotube infused material imparting a first functionality to the structure, and (2) a second carbon nanotube infused material imparting a second functionality to the structure. In some embodiments, the composite structure has additional carbon nanotube infused materials imparting additional functionalities to the structure.

In some aspects, embodiments disclosed herein relate to methods including providing a structure supported by air having a composite structure having at least (1) a first carbon nanotube infused material imparting a first functionality to the structure, and (2) a second carbon nanotube infused material imparting a second functionality to the structure. In some embodiments, the composite structure has additional carbon nanotube infused materials imparting additional functionalities to the structure. Carbon nanotube loading of the carbon nanotube infused materials can be selected based on the corresponding functionalities.

DETAILED DESCRIPTION

Figure 1:
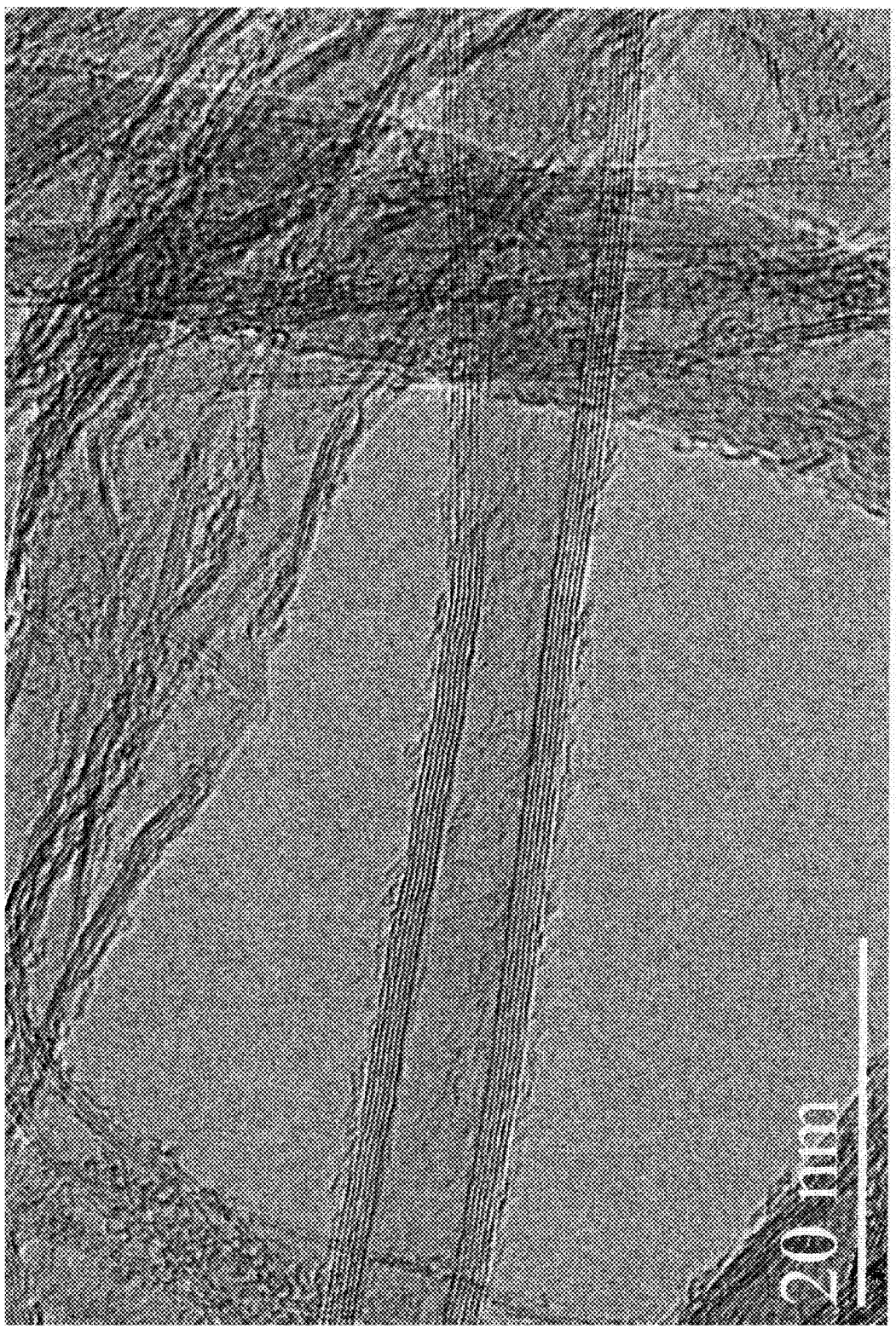
FIG. 1 shows a transmission electron microscope (TEM) image of a multi-walled CNT (MWNT) grown on PAN-BASED carbon fiber via a continuous chemical vapor disposition (CVD) process.

Tailored multiscale composites have been developed utilizing CNT-infused fibers. CNTs can be grown directly onto the surface of glass and carbon fibers in a continuous, in line process utilizing a modified CVD process, such as the one described in Applicant's co-pending applications, U.S. Publication Nos. 2010/0279569 and 2010/0178825, both of which are incorporated herein by reference in their entirety. Composite structures made with CNT-infused fiber materials have shown increased mechanical properties, specifically in shear—interlaminar and in-plane. Additionally these composite structures have improved electrical and thermal conductivity, based on the CNT loading and orientation. These CNT-infused fiber materials can be used in composite structures in various orientations and locations to provide custom tailored properties, including properties not available to current fiber materials.

The CNT-infused fiber composite can employ any type of fiber substrate, including, for example, carbon, glass, alumina, silicon carbide, or Kevlar. Moreover, since many fiber-types are used in mechanical strengthening applications, the infused CNTs can perform an additional role in enhancing mechanical strength. A range of CNT loading in CNT-infused fiber materials can be specified to afford the functionality required for a given composite part. More specifically, the CNT loading can be varied based on the location of a particular CNT-infused fiber material within each composite structure for custom tailoring and optimization. Depending on functionality desired at particular points on a structure, the structure can have different CNT loading ranges at different locations within the CNT-infused fiber material, different CNT loading ranges in different layers (or gradients) of a given CNT-infused fiber material, or different CNT loading ranges for different CNT-infused fiber materials. CNT loading on the fiber and in the overall composite can be selected from a variety of ranges. For example, CNT loading in the composite can be divided into four ranges. In some embodiments, the "low" range can be from 0.01% to 2%. The "low" range can be from approximately 0% to approximately 2%, including loadings such as 0%, 1%, 2%, and fractions thereof The "mid" range can be from approximately 2% to approximately 5%, including loadings such as 2%, 3%, 4%, 5%, and fractions thereof The "high" range can be from approximately 5% to approximately 40%, including loadings such as 5%, 10%, 15%, 20%, 25%, 30%, 35%, 40% and fractions thereof. The "ultra-high" range may be greater than approximately 40%.

Fiber reinforced composite structures are used in advanced air-based applications since their properties can be tailored to fulfill a given set of requirements. For example, a particular lamina stacking sequence can be used to optimize a composite beam for flexural stiffness or another sequence can be used to optimize for torsional rigidity. Hybrid composites, which utilize two different types of reinforcement fiber, benefit from the positive contributions of each fiber towards overall composite properties whether mechanical, thermal, electrical, etc.

A wide range of functionality applicable for air-based composite structures is available through different levels of CNT loading in CNT-infused fiber materials. Such CNT-infused fiber materials can include continuous fiber, chopped fiber, or woven fabrics.

Such functionality can include electromagnetic interference (EMI) shielding, lightning strike protection, damage sensing, de-icing, mechanical properties including but not limited to interlaminar and in-plane shear strength and modulus, tensile strength and modulus, compressive strength and modulus, flexural strength and modulus, crack and propagation resistance, thermal conductivity improvements, radar absorption and/or flame resistance.

In some applications, high levels of CNT loading can provide EMI shielding and/or lightning strike protection functionality. Such functionality can prevent undesirable effects of electromagnetic conduction or electromagnetic radiation on sensitive electrical circuits, or provide a mechanism through which the current can pass without significant degradation to the matrix surrounding the base fibers, as described in Applicant's co-pending application, U.S. Publication No. 2010/0270069, which is incorporated herein by reference in its entirety. EMI shielding composites and/or lightning strike protection composites can have CNT-infused fiber materials, disposed in a portion of a matrix material. The composite can be capable of absorbing electromagnetic (EM) radiation, reflecting EM radiation, or combinations thereof in a frequency range from between about 0.01 MHz to about 18 GHz. The EM shielding capacity of the composite, measured as EMI shielding effectiveness (SE), is in a range from between about 40 decibels (dB) to about 130 dB. CNTs have desirable electromagnetic absorption properties due to their high aspect ratio. The CNTs in the composites can be capable of absorbing a broad range of EM radiation frequencies, and dissipating the absorbed energy to an electrical ground and/or as heat, for example. Mechanistically, the CNTs can also reflect EM radiation. Moreover, for EMI shielding applications, any combination of absorption and reflectance can be useful as long as transmittance of the electromagnetic radiation is minimized. Regardless of the actual operable mechanism, and without being bound by theory, composites can operate by reducing and/or preventing substantial electromagnetic interference. The EMI shielding composites can improve the shielding characteristics of materials already employed in EMI shielding applications. CNT-infused fibers can impart improved EMI shielding of dielectric as well as conductive composites, resulting in the ability to use low weight, high strength composites. Some such composites may have been previously limited in application due to their inherently poor EMI shielding capabilities. EMI shielding composites can provide an absorbent surface that is nearly a black body across different sections of the electromagnetic spectrum including visible, infrared (IR) and other portions of various radar bands. In order to achieve black body-like behavior, the CNT density on the fiber material can be controlled. Thus, for example, the refractive index of the CNT-infused fiber material can be tuned to closely match the refractive index of air. According to Fresnel's law, this is when reflectance would be minimized. Although minimizing reflection can be useful to optimize EM absorption, the composites can also be designed to minimize transmittance through the EMI shielding layer. In other words, absorption is useful to the extent that it can provide EMI shielding. For a particular wavelength that is not effectively absorbed by the CNT-infused fiber material, it is beneficial to provide reflectance or provide a secondary structure capable absorbing the radiation not absorbed by the CNT-infused fiber material. In this regard, it can be beneficial to provide progressive layering of different CNT-infused fiber materials to provide alternate absorption characteristics. Alternatively, or in addition to multiple-layered materials, it can also be useful to incorporate a reflecting material, which can also be a CNT-infused fiber material. Thus, for example, a composite of the present invention can have multiple absorbing and/or reflecting layers comprising CNT-infused fiber materials. The fiber material itself can act as a scaffold that organizes the CNTs in an array that provides an overall composite with sufficient CNT density to create effective percolation pathways for dissipation of the energy upon EM radiation absorption or lightning strike. The infused CNTs can be tailored to have a uniform length, density, and controlled orientation on the fiber material and in the overall composite to maximize EM radiation absorption and/or lightning strike protection. By relying on CNTs for EM shielding properties and/or lightning strike protection, the composites can utilize fiber materials and/or matrices that are either conducting or insulating. Moreover, the EMI shielding and/or lightning strike protection composites can be integrated as part of the surface structure of the article in which it is used. In some embodiments, an entire article can function as an EMI shield and/or lightning rod, not just the surface. In some embodiments, CNT-infused fiber materials can be employed as a coating for pre-fabricated composites for use in EMI shielding and/or lightning strike protection applications. Methods of manufacturing an EMI shielding and/or lightning strike protection composite can include disposing a CNT-infused fiber material in a portion of a matrix material with a controlled orientation of the CNT-infused fiber material within the matrix material, and curing the matrix material. The controlled orientation of the CNT-infused fiber material can control the relative orientation of CNTs infused thereon within the overall composite structure. The manufacturing process to create CNT-infused fibers can be amenable to large scale continuous processing. In the process, CNTs are grown directly on carbon, glass, ceramic, or similar fiber materials of spoolable dimensions, such as tows or rovings. The nature of the CNT growth is such that a dense forest is deposited at lengths that can be tuned between about 5 microns to about 500 microns long, the length being controlled by various factors as described below. This forest can be oriented such that the CNTs are perpendicular to the surface of each individual filament of a fiber material thus providing radial coverage. The CNTs can be further processed to provide an orientation that is parallel to the axis of the fiber material. The resulting CNT-infused fiber materials can be employed in the as-manufactured form, or can be woven into fabric goods for use in producing the EMI shielding and/or lightning strike protection composites used in EMI shielding and/or lightning strike protection applications. A panel can include the EMI shielding and/or lightning strike protection composite and can be adaptable to interface with a device for use in EMI shielding and/or lightning strike protection applications. Such a panel can be further equipped with an electrical ground.

In some applications, low levels of CNT loading can provide damage sensing functionality. The CNTs can provide a percolation network that can be instrumented to measure changes in resistance or signal transmission. Such measured changes can provide information on the amount of damage the composite has sustained. Such damage sensing functionality can be in the form of a skin or structure, either fabric, or multi-directional tow-based or chopped fiber, as described in Applicant's co-pending application, Ser. No. 12/900,405, filed Oct. 7, 2010, which is incorporated herein by reference in its entirety. Damage sensing composites can include CNT-infused fibers in at least a portion of a matrix material. The composites can be utilized in any platform for monitoring the integrity of composite materials in structural components. Such damage sensing composites can utilize a variable source signal, while taking advantage of a scalable manufacturing process, to create a damage detection system having a high degree of control and sensitivity. Composites can be tailored to a specific applications and can be used to 1) detect types of damage to the composite through in situ monitoring, including monitoring of stresses on the materials prior, during, and/or after use; and 2) reduce the likelihood of catastrophic failure by providing structural enhancement and real time assessment of structural integrity. One component of the composite materials is the CNT-infused fiber. Having CNTs infused on a fiber carrier facilitates manufacturing of large composite structures using conventional fiber-reinforced composite manufacture techniques to incorporate the CNT element throughout the composite or in strategic portions of a composite article. Because CNT density and distribution is tightly controlled with CNT-infused fibers compared to loose CNTs, the amount of CNTs can be substantially reduced. Moreover, having the CNTs on fibers allows for synergistic mechanical strength enhancement due to the CNT-fiber organizational hierarchy, allowing the CNTs to perform a dual role in both sensing damage as well as contributing to structural integrity by assisting in redistribution of load bearing stresses. The fiber carrier also facilitates strategic placement of CNTs throughout an entire 3-dimensional article or in a 2-dimensional "skin." This strategic placement allows control of conductivity along the fiber axis and the transverse direction. The properties of the composite can be modulated by control of CNT density, length, placement, and alignment, for example. Thus, composites can be tailored to a specific application and/or to detect any type of damage, as well as reduce the likelihood of damage. The infused CNTs can affect the electrical properties of the composite and can serve to create percolation pathways that allow continuous, non-continuous, or intermittent monitoring of the stress on the composite material. The resting state of a composite can have associated percolation pathways with measurable electrical properties such as resistance, for example, that can be monitored by an appropriately positioned pair of sensors, such as an electrode pair. As the material experiences strain, some of the CNT to CNT contacts are broken resulting in fewer operable percolation pathways. Consequently, the resistance increases across the composite while it is experiencing this strain load, which can be reversible or not. Composites made using the CNT-infused fibers bearing CNTs tailored for improved electrical properties can be used in damage sensing applications. Composites can also be used to improve composite strength. In a particular application, a CNT-infused fiber can be used in specific locations to improve composite strength as well as provide a means for damage detection at important structural components. One such application is in composite lap joints where one composite structure is bound to another composite structure (one structure can be perpendicular or parallel to the other). The bounded interface between the structures is of particular interest because it is considered the weak part of the structure. Utilizing the CNT-infused structure at this location allows for improved Interlaminar Shear Strength (ILSS) as well as the ability to provide damage detection. Composites can be used in a method of detecting stresses within the composite material that includes monitoring modulated electrical signals (waveform along with amplitude and frequency) and assessing structural integrity with improved detection resolution and sensitivity. Amplitude measurements can be used to measure strain. Phase can be used to monitor crack propagation. Frequency can be used to identify crack size. A network of electrodes can be engaged or otherwise integrated with sensing circuitry that can be used to measure and map location of strain, fatigue, damage, and cracks in the composite. Composites, systems, and methods integrating damage sensing functionality can be used in a variety of industries, for example, from the commercial airplane industry to ballistic armor damage detection on tanks and other military armored vehicles.

Mid-range levels of CNT loading can provide de-icing functionality in some applications. The amount of CNTs can be tailored to the particular structure, or portion of the structure, based on the required resistance, as described in Applicant's co-pending application, Ser. No. 12/767,719, filed Apr. 26, 2010, which is incorporated herein by reference in its entirety. De-icing composites can have a matrix material and a carbon nanotube CNT-infused fiber material. The CNT-infused fiber material can be disposed throughout a portion of the matrix material and the composite structure adapted for application of a current via the CNT-infused fiber material to provide heating of the matrix material to de-ice or prevent the formation of ice on a surface of the composite structure. Without being bound by theory, the CNTs of the CNT-infused fiber can alter the conductance of the bulk matrix material by providing percolation conductivity. The percolation conductance of the composite structures can be the result of CNT-to-CNT point contact, CNT interdigitation/overlap, or combinations thereof. While the CNTs provide percolation conductance pathways, the fiber carrier to which they are fused provides control of 1) CNT orientation and degree of anisotropy, 2) CNT concentration, and 3) CNT location within the bulk matrix material. Incorporation of CNTs infused to a fiber, within the composite materials allows for the use of the composite structure itself as a resistive heating element. In this manner, de-icing a structure such as the wing, fuselage, or tail assembly of an aircraft (or a helicopter) formed from such composite materials requires no additional heating devices. CNTs are introduced at the fiber level where mass percentages of greater than 3% can be achieved. The CNT-infused fiber material can be used with conventional matrices and can be optionally doped with additional CNTs that are not infused to the fiber to create composite structures. By tailoring the CNT mass percentage present, the resistivity of the structure can be adjusted and controlled to provide the appropriate thermal/conductive properties for using the material as a resistive heating element. The CNT-based composite material can be used as either a surface layer for targeted areas of a structure (such as the wing, fuselage, and tail assembly) or over the entire composite structure, where it can be used to make any article for use in deicing applications. The CNT-infused fiber composite can be a composite material that is itself a resistive heating element. The metal spray coating "heater mat" approach employed in the art for de-icing applications uses a manufacturing processes that increases cost and complexity, metal spray coatings used over large surface areas of a composite structure can also increase the overall structure weight. Additionally, the use of metal as the resistive heating element brings the risk of galvanic corrosion (which is addressed by using glass layers—a weak interface within the structure), and after repeated use the risk of structure failures. Finally, since the metal coating is not a similar material within the composite structure, it can act as a weak point within the composite structure. The incorporation of CNTs in composite structures reduces or eliminates each of these problems. Since traditional composite materials are used with CNTs, the methods for manufacturing the composite structures remain virtually unchanged. Methods used to incorporate CNTs on composite fibers have also been developed that result in low cost material solutions, which combined with the similar manufacturability result in a simple low cost solution (with no weight increase—in fact, weight could be reduced if CNT/fiber materials were used as the structural component as well). Since metals are not used to provide the electrical path, galvanic corrosion can be avoided using CNTs. Finally, since the material used to incorporate the CNTs in a fiber, if used as a resistive heating layer, it will not result in a weakening in the overall structure. Thus, a large circuit can be created when an electrical potential is applied, such that the CNTs act as a large resistive heater to prevent or remove icy conditions. Such construction can avoid the need for external heating. Mid-range levels can be chosen because too few CNTs would require high voltage potential to create a current, whereas too many CNTs would not offer enough resistance to act as a heating element. Such de-icing formulations can be in the form of one or more patches of fabric with CNT coated leads, or can be simply embedded tows providing the current pathway.

In some applications, mid-range levels of CNT loading can provide shear strength functionality. The CNTs can afford greater shear strength of the matrix, as well as improve the load transfer between filaments. The composite can be comprised of unidirectional fibers, chopped fibers, or fabric.

Some structures can include a composite structure to handle high shear loading in the central planes, but can be electrically insulated through the thickness. CNT-infused fiber materials can be used for the central lamina of a tailored composite to improve the maximum shear strength characteristics. Unmodified fibers can be used as the surface layers to provide the electrical insulation properties.

In certain applications, low levels of CNT loading can provide tensile strength functionality. Thus, the baseline filament strength can be augmented with the strength of the CNTs themselves. The low CNT loading can accommodate high fiber packing, leading to a stronger composite given that the tensile strength of a composite in the fiber direction is directly proportional to the amount of fibers. Close packing of the filaments can also enhance the entanglement between the CNTs, which can increase the effectiveness of the interfilament load transfer. Additionally, advanced processing of the CNT material can align the CNTs in the direction of the substrate filaments, to directly utilize the strength of the CNTs to increase overall tensile strength of the composite in the fiber direction.

Low levels of CNT loading can provide compressive strength functionality in some applications. Thus, the baseline filament strength is augmented with the strength of the CNTs themselves. The low CNT loading can accommodate high fiber packing, leading to a stronger composite given that the compressive strength of a composite in the fiber direction is directly proportional to the amount of fibers. Close packing of the filaments can also enhance the entanglement between the CNTs, which can increase the effectiveness of the interfilament load transfer. Additionally, the CNTs can increase the shear stiffness and strength of the matrix and thus help prevent micro-buckling of the filaments.

In some applications, mid-range levels of CNT loading can provide crack resistance functionality. The CNTs can toughen the matrix, which is commonly the weak link. A crack generally travels more easily through the matrix than through the filaments. Thus, the CNTs can function as crack-arresting mechanisms.

High levels of CNT loading can provide thermal conductivity functionality in some applications. In such applications, the CNTs can provide an interconnecting pathway through which heat can be transferred, as described in Applicant's co-pending application, Ser. No. 12/767,719, filed Apr. 26, 2010, which is incorporated herein by reference in its entirety. Thermally conductive composites can have a matrix material and a carbon nanotube CNT-infused fiber material. The CNT-infused fiber material can be disposed throughout a portion of the matrix material and the composite structure adapted for application of a current via the CNT-infused fiber material to provide thermal conductivity of the matrix material. Without being bound by theory, the CNTs of the CNT-infused fiber can alter the conductance of the bulk matrix material by providing percolation conductivity. The percolation conductance of the composite structures can be the result of CNT-to-CNT point contact, CNT interdigitation/overlap, or combinations thereof While the CNTs provide percolation conductance pathways, the fiber carrier to which they are fused provides control of 1) CNT orientation and degree of anisotropy, 2) CNT concentration, and 3) CNT location within the bulk matrix material. Incorporation of CNTs infused to a fiber, within the composite materials allows for the use of the composite structure itself as a thermally conductive element. CNTs are introduced at the fiber level where mass percentages of greater than 3% can be achieved. The CNT-infused fiber material can be used with conventional matrices and can be optionally doped with additional CNTs that are not infused to the fiber to create composite structures. By tailoring the CNT mass percentage present, the resistivity of the structure can be adjusted arid controlled to provide the appropriate thermal/conductive properties for using the material as a thermally conductive element. The CNT-based composite material can be used as either a surface layer for targeted areas of a structure or over the entire composite structure, where it can be used to make any article for use in thermal applications. The CNT-infused fiber composite can be a composite material that is itself a resistive heating element. The CNT-infused fiber composite can employ any type of fiber substrate, including, for example, carbon, glass, alumina, silicon carbide, or Kevlar. Moreover, since many fibertypes are used in mechanical strengthening applications, the infused CNTs can perform an additional role in enhancing mechanical strength. The use of metal as the resistive heating element brings the risk of galvanic corrosion (which is addressed by using glass layers—a weak interface within the structure), and after repeated use the risk of structure failures. Finally, since the metal coating is not a similar material within the composite structure, it can act as a weak point within the composite structure. The incorporation of CNTs in composite structures reduces or eliminates each of these problems. Since traditional composite materials are used with CNTs, the methods for manufacturing the composite structures remain virtually unchanged. Methods used to incorporate CNTs on composite fibers have also been developed that result in low cost material solutions, which combined with the similar manufacturability result in a simple low cost solution (with no weight increase—in fact, weight could be reduced if CNT/fiber materials were used as the structural component as well). Since metals are not used to provide the electrical path, galvanic corrosion and difference in thermal expansion can be avoided using CNTs. Finally, since the material used to incorporate the CNTs in a fiber, if used as a resistive thermally conductive layer, it will not result in a weakening in the overall structure. Thus, a large circuit can be created when an electrical potential is applied, such that the CNTs act as a large thermal conductor. Such thermally conductive formulations can be in the form of one or more patches of fabric with CNT coated leads, or can be simply embedded tows providing the current pathway.

High levels of CNT loading can provide embedded circuitry functionality in particular applications. In such applications, the CNTs can provide the electrical pathway through which signals can be transferred.

In some applications, a gradient of CNT loading can provide radar absorbent material (RAM) functionality. Increasing CNT loading from the surface of the structure toward the interior of the structure allows radar waves to penetrate and be trapped between the exterior and the interior of the structure via internal reflection, as described in Applicant's co-pending application, U.S. Publication No. 2010/0271523, which is incorporated herein by reference in its entirety. Some composite materials are RAMs. Radar absorbing composite materials can have CNT-infused fiber materials disposed in a portion of a matrix material. The composite can be capable of absorbing radar in a frequency range from between about 0.10 Megahertz to about 60 Gigahertz. CNTs have desirable electromagnetic absorption properties due to their high aspect ratio, high conductivity, and when infused to a fiber material can be tailored for specific surface coverage densities. The CNTs in the overall composite can be capable of absorbing radar and dissipating the absorbed energy as heat, for example. The radar absorbing composite materials can improve the absorption characteristics of already low observable surfaces. CNT-infused fibers can impart improved signature control of dielectric (insolative—transparent to radar) as well as conductive (significantly reflective to radar) composite materials, resulting in the ability to use low weight, high strength composites. Radar absorbing composite materials can provide an absorbent surface that is nearly a black body across different sections of the electromagnetic spectrum including the visible region and various radar bands. CNTs infused on fibers allow tailored arrangement of particular CNT densities in various layers to create a radar absorbing structure. That is, the radar absorbing capacity can be achieved by providing varying CNT density across the depth of the material. The CNT-infused fiber material can form a first layer that reduces radar reflectance and a second layer that dissipates the energy of the absorbed radar. The fiber material can act as a scaffold that organizes the CNTs in an array that provides an overall composite with appropriate CNT density at different depths to provide internal reflection in some, layers and effective percolation pathways for dissipation of the energy upon radar absorption in other layers. Still other layers can provide a combination of internal reflection and percolation pathways to dissipate the absorbed radar energy. The infused CNTs can be tailored to have a uniform length, density, and controlled orientation on the fiber material based on a continuous CNT infusion process. The CNT-infused fiber thus obtained is then disposed within a composite structure to maximize radar absorption. In particular, near the surface of a composite, CNT densities can be relatively low, creating a material that has a dielectric constant similar to air or a refractive index close to air creating a black body-like structure where radar reflectance is substantially minimized. That is, in order to suppress reflection, the refractive index of the object can be close to that of air. This solution to minimize reflectance is evident from Fresnel's law: $R=(n-n_0)^2/(n+n_0)^2$, where R is reflectance, n is the refractive index of the object, and $n_o$ is the refractive index of air. The CNT density on the fiber material can be modulated in the continuous process described herein below such that the CNT-infused fiber material can be tuned to exhibit a CNT density such that the refractive index, n, in a layer of CNT-infused fiber within a composite structure approximates that of air, $n_0$. By relying on CNTs for radar absorption, the composite materials can utilize either conducting or insulating fiber materials and/or matrices. Moreover, the radar absorbing composite materials can be integrated as part of the surface and/or the overall structure of the low observable. In some embodiments, the entire structure can function as a RAM, obviating the issues of wear, chipping and the like associated with coated RAM paints, for example. Significantly, unlike the urethane-type foams, the composite RAMS can be structural, allowing for substantial weight reductions to be achieved relative to their foam counterpart. In some embodiments, CNT-infused fiber materials can be employed as a coating while avoiding the problems associated with chipping/wear, and the like due to the extended lengths of fiber material employed. Methods of manufacturing a radar absorbing composite can include disposing a CNT-infused fiber material in a portion of a matrix material with a controlled orientation of the CNT-infused fiber material within the matrix material, and curing the matrix material. The controlled orientation of the CNT-infused fiber material can control the relative orientation of CNTs infused thereon. The manufacturing process to create CNT-infused fibers for the aforementioned radar absorbing materials can be amenable to large scale continuous processing. In the process, CNTs can be grown directly on carbon, glass, ceramic, or similar fiber materials of spoolable dimensions, such as tows or rovings. The nature of the CNT growth is such that a dense forest can be deposited at lengths that can be tuned between about 100 nanometers to about 500 microns long, the length being controlled by various factors as described below. This forest can be oriented such that the CNTs are perpendicular to the surface of each individual filament of a fiber material thus providing radial coverage. The CNTs can be further processed to provide an orientation that is parallel to the axis of the fiber material. The resulting CNT-infused fiber materials can be wound as manufactured or can be woven into fabric goods for use in producing the radar absorbing composite materials used in low observable structures. Significantly, the continuous process can allow for the production of sections of CNT-infusion with varied CNT density. This readily allows for the manufacture of multi-layered structures which, when assembled, contribute to the overall radar absorbing capability. A panel can include the radar absorbing composite and can be adaptable to interface as a structural component of, for example, a transport vessel, projectile, or missile for use in stealth applications.

Flame resistant composite materials can include carbon nanotube-infused fibers in a matrix material. The flame resistant composite material can be a textile. Such flame resistant textiles can include carbon nanotube-infused fibers in a matrix material. CNT-infused textiles CNTs can be infused on a variety of fiber reinforcements at the tow or roving level prior to textile weaving. Alternatively CNT infusion can occur after weaving the textile to the specified weave architecture. The CNTs can occupy intra-tow and inter-tow space to achieve high-volume CNT loading. Flame resistant textiles can be used as a primary material and in fiber reinforced composite structures with resin systems that are not inherently flame resistant. Textiles of CNT-infused fiber do not require additional coatings to protect from flame exposure. Without being bound by theory, the CNT-infused fiber reinforcement is itself flame resistant due to the density and thermo-oxidative stability of CNTs throughout the composite, which can act as a barrier and allow decomposition of the surface resin only and will not allow penetration of thermal decomposition of the composite. In some embodiments, alignment of the CNTs along the axial direction of the fiber can allow thermal transport along the surface of the textile but limit conductivity through the thickness, which can further promote flame resistance. Alignment of infused CNTs on fiber substrates can be achieved by mechanical means, by employing a plasma, or other methods known in the art.

Some air-based systems can incorporate the above-mentioned functionality into composite structures in varying combinations. For example, the structures such as nose cones or other parts of missiles, aircraft wings, primary structural parts, such as flaps and aerofoils, propellers and air brakes, fuselages, helicopter shells and rotor blades, aircraft secondary structural parts, such as floors, doors, seats, air conditioners, and secondary tanks, airplane motor parts, and weather balloon instrument structures can benefit from the structural enhancement provided by CNT-infused fiber materials. Any of these examples, along with other air-based systems can incorporate one or more composite structures to provide enhanced functionality.

Depending on the structure or the portion of the structure, various functionalities can be selected. As a structural example, a composite component can be subjected to a variety of loadings. The component can have a joint that carries a shear load while another portion supports a compressive load. The portion subject to shear and susceptible to delamination failure can be made mid-range CNT loaded material, while the portion supporting tensile load can utilize low CNT loaded material.

The CNT-infused fiber materials can be produced in a continuous fashion with precise control of the CNT loading, CNT length, and CNT orientation. Other hybrid composite systems incorporating nanoscale reinforcement require additional processing steps to properly disperse the nanoparticles of nanotubes into the matrix. In addition, the ability to create a lamina with specific CNT loading different from the next layer can be achieved through a CNT-infusion process. The CNT-infused fiber materials can be incorporated into a composite using the same manufacturing techniques used for un-processed glass and carbon filaments without the need for extra processing steps including, for example, orienting the CNTs or sectional layering in multilayered composites. Moreover, because the CNTs are infused to a fiber carrier, the issues associated homogeneous incorporation of CNTs, CNT bundling, agglomeration, and the like, are alleviated. CNT-infused fiber materials allow the composite structure to have larger CNT loading than can be achieved by simply mixing CNTs directly with the composite matrix material.

In structural composites, it is typical to have roughly a 60% fiber to 40% matrix ratio; however, the introduction of a third element, that is the infused CNTs, allows these ratios to be altered. For example, with the addition of up to about 25% CNTs by volume, the fiber portion can vary between about 35% to about 60% with the matrix range changing to about 40% to about 65%. The various ratios can alter the properties of the overall composite, which can be tailored to target one or more desired characteristics. The properties of CNTs lend themselves to fibers that are reinforced with them. Utilizing these enhanced fibers in tailored composites similarly imparts increases that will vary according to the fiber fraction, but can still greatly alter the properties of tailored composites compared to those known in the art.

Figure 2:
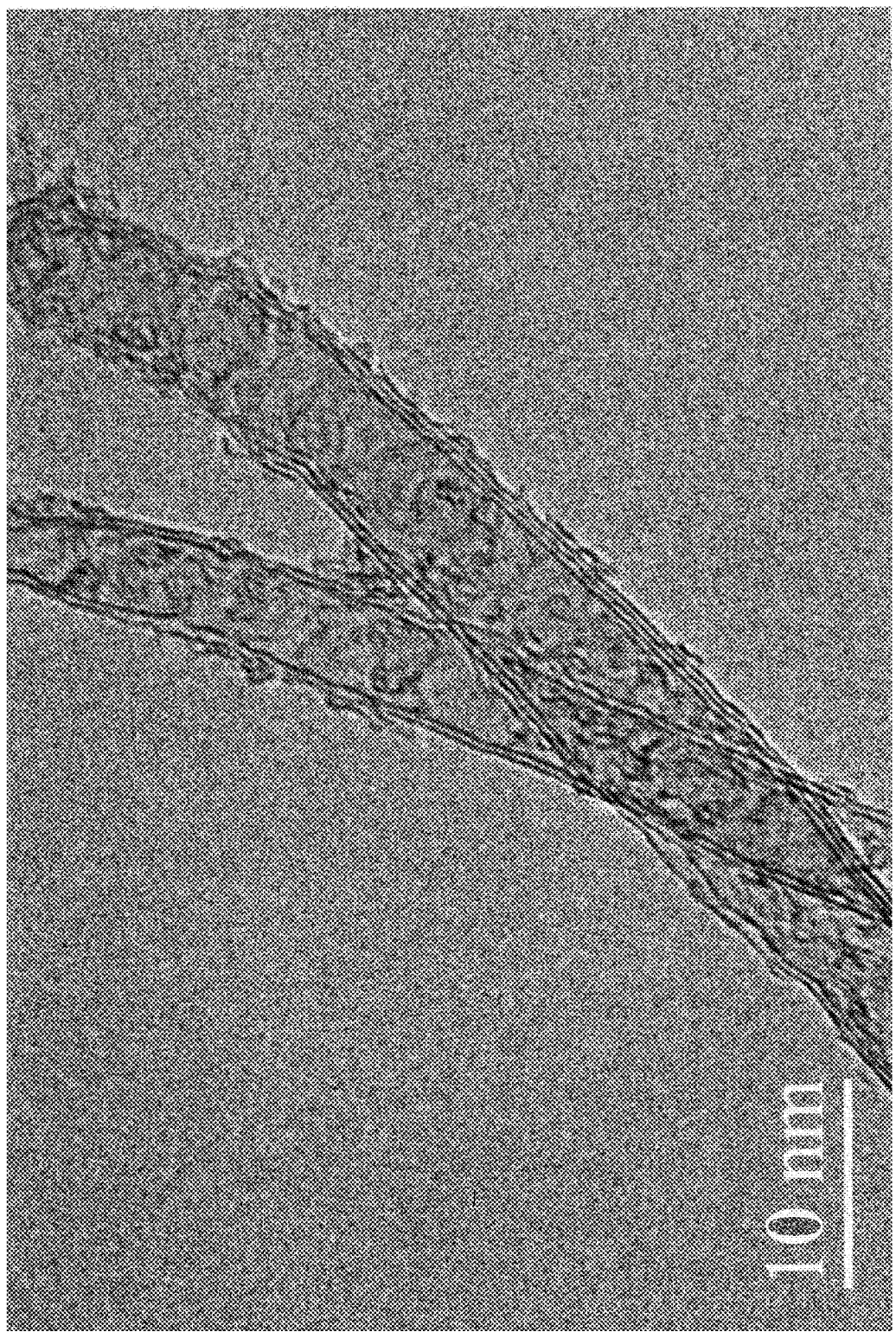
FIG. 2 shows a TEM image of a double-walled CNT (DWNT) grown on PAN-BASED carbon fiber via a continuous CVD process.
Figure 3:
FIG. 3 shows a scanning electron microscope (SEM) image of CNTs growing from within the barrier coating where the CNT-forming nanoparticle catalyst was mechanically infused to the fiber material surface.
Figure 4:
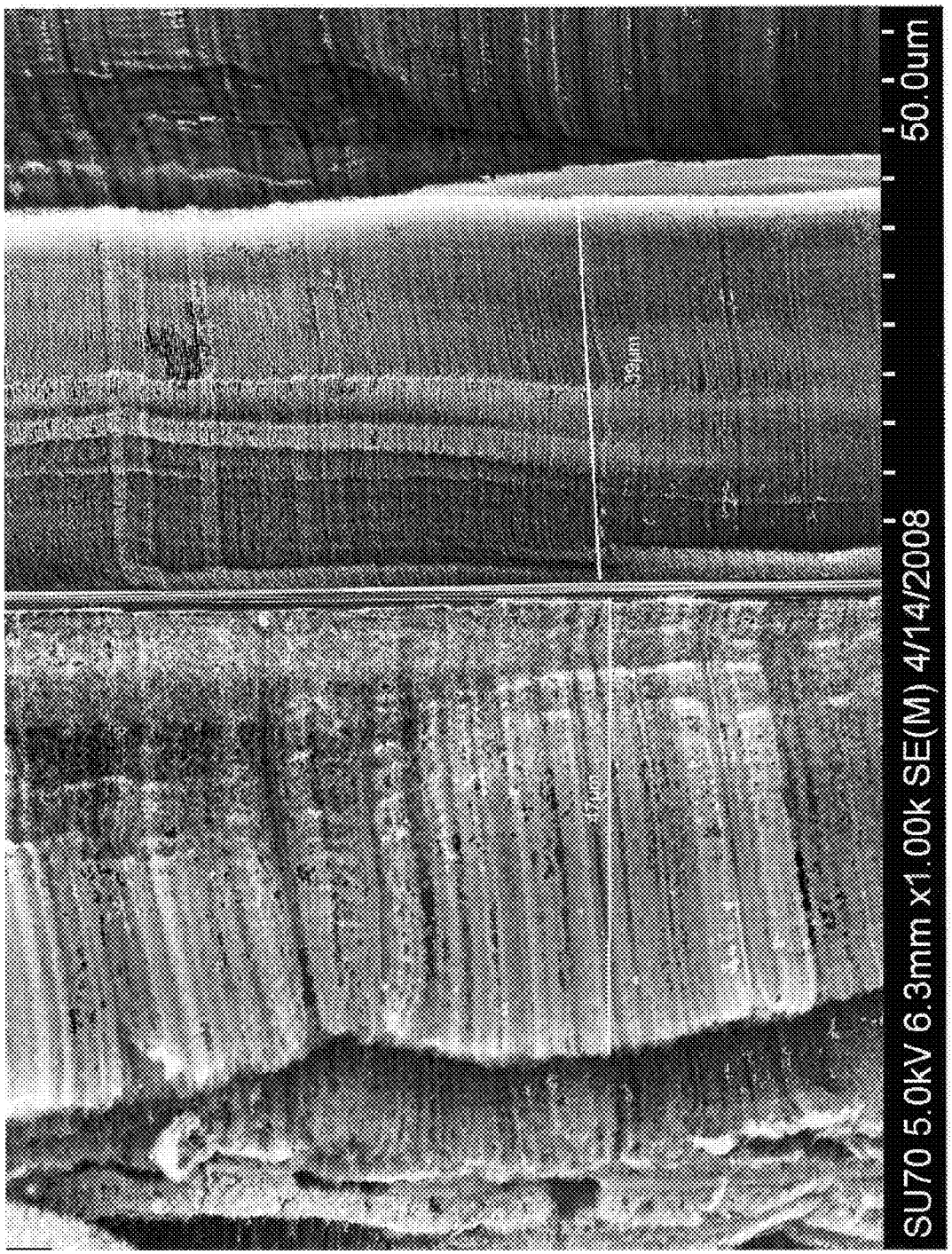
FIG. 4 shows a SEM image demonstrating the consistency in length distribution of CNTs grown on a fiber material to within 20% of a targeted length of about 40 microns.
Figure 5:
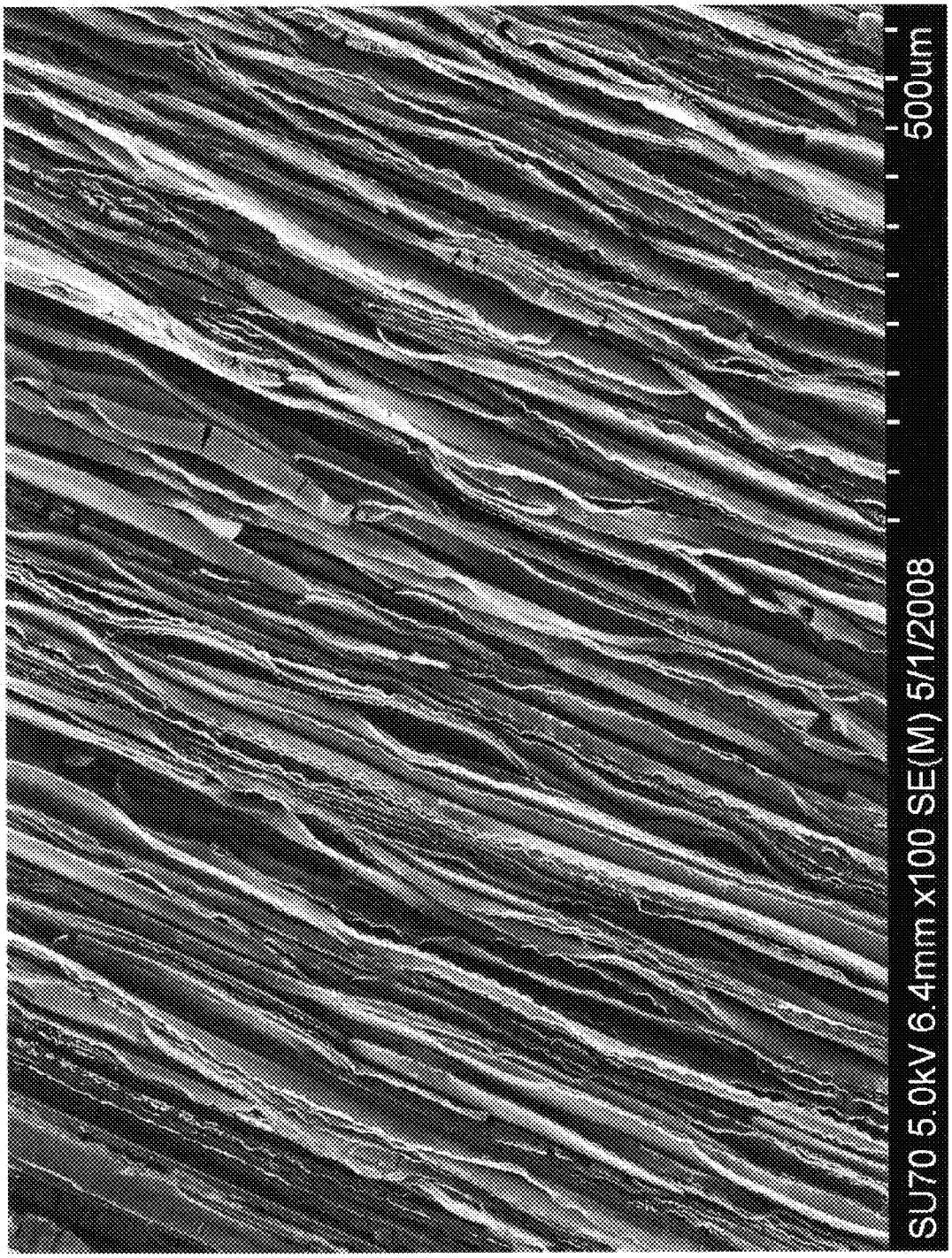
FIG. 5 shows a low magnification SEM of CNTs on carbon fiber demonstrating the uniformity of CNT density across the fibers within about 10%.

FIGS. 1-5 show TEM and SEM images of fiber materials. FIGS. 1 and 2 show TEM images of MWNTs and DWNTs, respectively, that were prepared on an PAN-BASED carbon fiber in a continuous process. FIG. 3 shows a scanning electron microscope (SEM) image of CNTs growing from within the barrier coating after the CNT-forming nanoparticle catalyst was mechanically infused to a fiber material surface. FIG. 4 shows a SEM image demonstrating the consistency in length distribution of CNTs grown on a carbon fiber material to within 20% of a targeted length of about 40 microns. FIG. 5 shows a low magnification SEM of CNTs on carbon fiber demonstrating the uniformity of CNT density across the fibers within about 10%.

Figure 6:
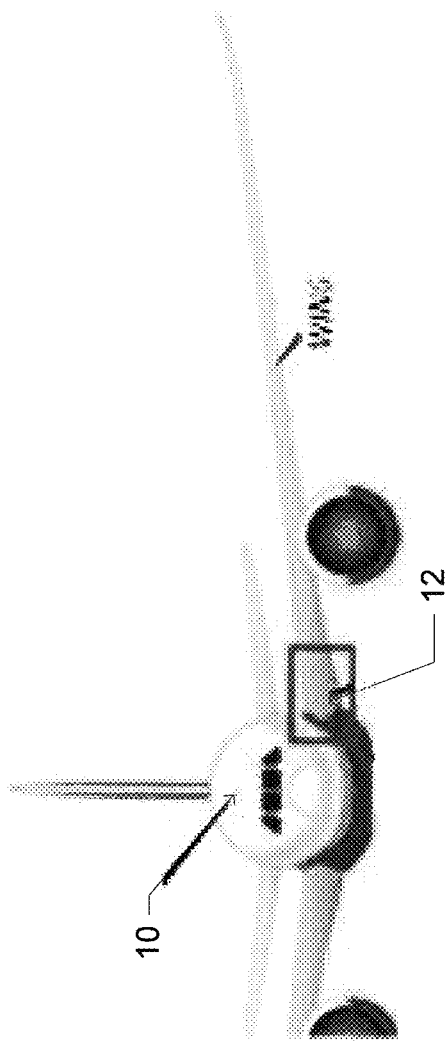
FIG. 6 shows a side view of a fuselage of an air-based apparatus, in accordance with one embodiment of the present disclosure.
Figure 7:
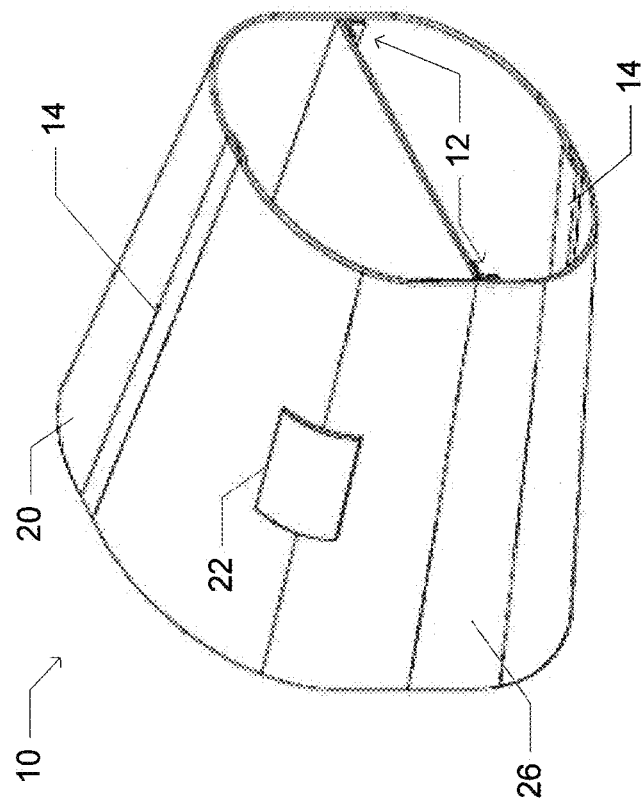
FIG. 7 a perspective view of a portion of a fuselage of an air-based apparatus in accordance with a particular embodiment of the present disclosure.

CNT-infused fiber materials can be used in a myriad of applications. For example, but not by way of limitation, air-based apparatus, such as airplanes can include air-based structures, such as aircraft fuselages. Composites are becoming widely accepted as a material for use in constructing aircraft fuselages. Referring to FIG. 6, the fuselage 10 includes several features, each with a specific function and specific requirements. Accordingly, the composites must perform various functions, depending on the location within the structure. Junctions 12 where external stringers or features such as wing attachment points are attached to the fuselage 10 must have sufficient shear, tensile, and compressive strengths to withstand the characteristic cyclic loading. Junctions 12 can also be formed by internal features, including cross-bracing or other structural support (as illustrated in FIG. 7). Mid-range CNT loading material and low CNT loading material can be layered into these junctions 12 to provide both the shear strength requirements and the tensile and compressive strength requirements.

Figure 8:
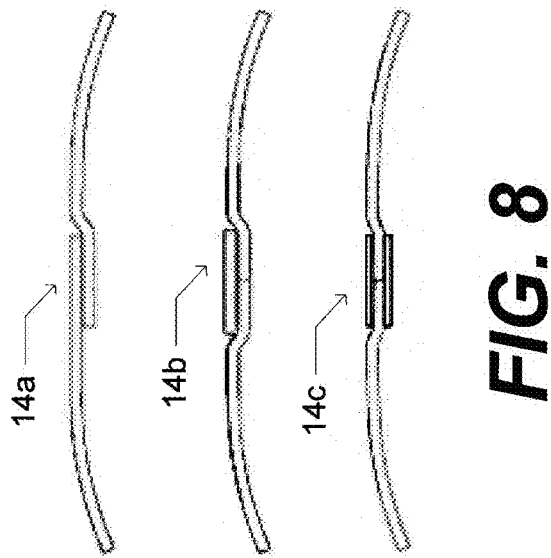
FIG. 8 is a cross sectional view of various alternative embodiments of a lap joint of a fuselage of an air-based apparatus, in accordance with particular embodiments of the present disclosure.
Figure 9:
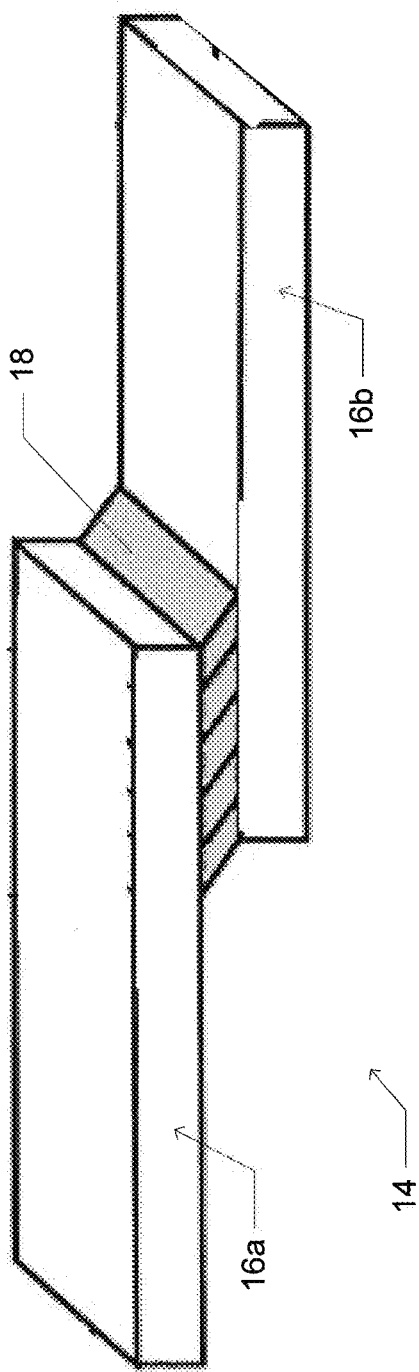
FIG. 9 is a perspective view of an embodiment of a lap joint of a fuselage of an air-based apparatus, in accordance with an embodiment of the present disclosure.

Referring now to FIG. 7, in the construction of the fuselage 10, lap joints 14 are formed where two pieces of composite must be joined. These lap joints 14 can be of various configurations. For example, as illustrated in FIG. 8, lap joints 14 can be single lap 14a, splice strap single lap 14b, or splice strap double lap 14c. These lap joints 14 require high shear strength and high crack resistance. Thus, mid-range CNT loading material can be used in the formation of lap joints 14, providing shear strength, and toughening. Referring to FIG. 9, the mid-range CNT loading material can form a portion of either or both of the composite pieces 16 (illustrated as 16a and 16b) to be joined. Additionally, or alternatively, the mid-range CNT loading material can form the splice strap or other connector 18.

Referring back to FIG. 7, lightning strike protection is required to ensure the safety of passengers and functionality of sensitive electronic equipment. Thus, an outer layer 20 of mid-range to high CNT loading material pay provide a pathway for the high current to flow without damaging the rest of the composite construction. The outer layer 20 of high CNT loading material can also provide EMI shielding functionality for sensitive instrumentation housed within the cockpit and other locations inside the aircraft.

Damage sensing capability is important in high stress areas, near lap joints 14, and near repair areas. Any area from which a crack can propagate is a good candidate for a damage sensing layer or skin 22 made from low CNT loading material. This skin 22 is ideally electrically insulated from other CNT material. However, high CNT loading material can be used to form the feedback circuit.

De-icing functionality is also critical for aircraft. Ice buildup adds weight to the craft and changes air flow around control surfaces, potentially decreasing lift. Mid-range CNT loading material can be used for thermal circuits in a middle layer 24 (illustrated in FIG. 10) of the composite. Current can run through this material to function as a resistive heater, providing enough heat to help remove ice buildup on the surfaces.

Figure 10:
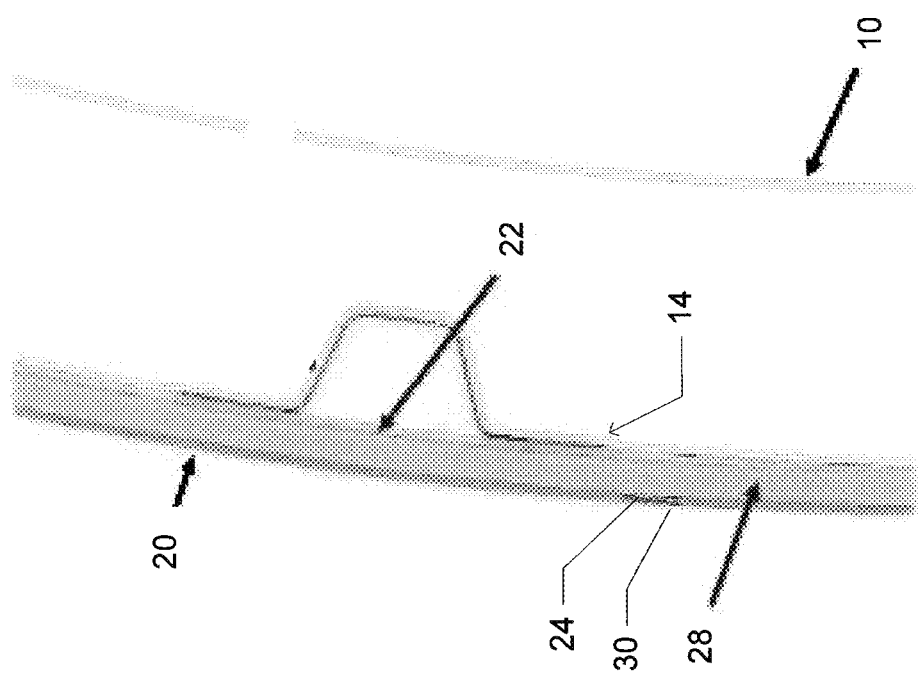
FIG. 10 is a cross-sectional side view of a portion of a fuselage of an air-based apparatus in accordance with one embodiment of the present disclosure.

Referring back to FIG. 7, certain portions of the fuselage 10 require high tensile strength. For such portions, panels 26 of low CNT loading material can be provided. Referring now to FIG. 10, the fuselage 10 can include mid-range CNT loading material in junctions 12 and lap joints 14. A damage sensing skin 22 made from low CNT loading material can be provided exterior to the junctions 12 and lap joints 14. Energy absorbing foam 28 can be provided exterior to damage sensing skin 22 to absorb impact, sound, and thermal energy and provide space for wires, antennae, etc. The middle layer 24 can include mid-range CNT loading material for de-icing. The middle layer 24 can be external to the energy absorbing foam 28, and can be partially or wholly covered by outer layer 20 of high CNT loading material providing EMI shielding and lightning protection. Paint 30 can cover outer layer 20 for smoothness for laminar flow.

Any of a number of different air-based structures can be constructed of composites and CNT-infused fiber materials designed or chosen based on CNT loading associated with various functionalities. Such functionalities can include, but are not limited to EMI shielding, lightning strike protection, damage sensing, de-icing, mechanical properties including but not limited to interlaminar and in-plane shear strength and modulus, tensile strength and modulus, compressive strength and modulus, flexural strength and modulus, crack and propagation resistance, thermal conductivity improvements, embedded circuitry capabilities, and radar absorption.

The location for application of the CNT-infused fiber material to a particular location on the air-based structure can be selected based on the specific conditions of the structure. CNT-infused fiber material with high CNT loading can be used certain locations on the structure. More particularly, high CNT loading can be useful (1) in locations prone to exposure to EMI, because high CNT loading provides EMI shielding, (2) in locations prone to lightning strikes, because high CNT loading provides lightning strike protection, (3) in locations where thermal conductivity is desired, because high CNT loading enhances thermal conductivity, and/or (4) in locations proximate electric circuitry, because high CNT loading facilitates transfer of electric signals.

Similarly, CNT-infused fiber material with mid-range CNT loading can be used in particular locations on the structure, such as (1) in locations prone to ice formation, because mid-range CNT loading provides appropriate resistance/conductivity for use in de-icing, (2) in locations prone to exposure to shear forces, because mid-range CNT loading enhances shear strength, and/or (3) in locations prone to cracking, because mid-range CNT loading enhances crack resistance.

Likewise, CNT-infused fiber material with low CNT loading can be used in certain locations on the structure, such as (1) in locations prone to damage, because low CNT loading facilitates damage sensing, (2) in locations prone to tensile forces, because low CNT loading enhances tensile strength, and/or (3) in locations prone to compressive forces, because low CNT loading enhances compressive strength.

Finally, CNT-infused fiber material with a gradient of CNT loading can be used in locations where radar absorption is desired. A gradient allows the radar waves to be absorbed in the outermost layer, while reflecting the radar waves from the innermost layer, preventing the waves from entering the structure, but also preventing the radar waves from being reflected off the structure.

Another example of an air-based structure would be a weather balloon instrument enclosure. This would need high CNT content material for EMI protection of the instrumentation within. Also low CNT content material could be utilized for providing the main structural requirements of the enclosure. De-icing functionality would be very important for weather balloon instrumentation, which would be provided by midrange CNT material in a dedicated layer of resistive circuitry. Other functionality could also be incorporated based on the application's requirements.

In some embodiments, methods of designing, selecting, constructing, or otherwise ensuring particular functionalities of an air-based structure can involve selecting the structure and identifying the desired functionalities. Once the desired functionalities have been determined, CNT-infused fiber materials with CNT loading ranges can be selected based on the corresponding desired functionalities. Providing an air-based structure comprising a composite material can involve purchase, fabrication, or other means. If the structure is being fabricated, CNT-infused fiber materials can be formed as part of the structure. In other instances, CNT-infused fiber materials can be applied to the pre-formed composite structure. In either scenario, a first CNT-infused fiber material and a second CNT-infused fiber material are provided. The first CNT-infused fiber material has a first range of CNT loading and is selected to provide the structure with a first functionality. Similarly, the second CNT-infused fiber material has a second range of CNT loading and is selected to provide the structure with a second functionality. The first CNT-infused fiber material is applied to the structure at a first location and the second CNT-infused fiber material is applied to the structure at a second location. In some instances, the first location and the second location are remote from each other, but still part of the structure. In other instances, the first location and the second location can be very close, overlap, or even occupy the same location of the structure. For example, the first CNT-infused fiber material can have a high CNT loading useful for EMI shielding and the second CNT-infused fiber material can have a low CNT loading useful for damage sensing. In such scenario, the second material can be applied directly to the structure, with the first material being applied to the second material as a separate layer.

In one embodiment, an air-based structure has flame resistance, electrical resistance, damage sensing, tensile strength, compressive strength, de-icing, shear strength, crack resistance, electromagnetic interference shielding, lightning strike protection, thermal conductivity, transfer of electric signals, and radar absorption functionalities. In other embodiments, an air-based structure has fewer than all of these functionalities. For example, some air-based structures have electromagnetic interference shielding, damage sensing, and strength functions or radar absorption, crack resistance, and lightning strike protection functionalities. In some embodiments, an air-based structure can have any one, two, three, four, five, six, seven, eight, nine, ten, eleven, or twelve functionalities selected from the following: flame resistance, electrical resistance, damage sensing, tensile strength, compressive strength, de-icing, shear strength, crack resistance, electromagnetic interference shielding, lightning strike protection, thermal conductivity, transfer of electric signals, and radar absorption functionalities. An air-based structure may have additional functionalities not listed above.

In some embodiments, the first amount and second amount of CNTs are different in different areas of a particular structure. This can be accompanied by a change in the CNT type or not. Thus, varying the density of CNTs can be used to alter the properties of the original fiber material, even if the CNT type remains unchanged. CNT type can include CNT length and the number of walls, for example. In some embodiments, the first amount and the second amount are the same. If different properties are desirable in this case along the two different stretches of the spoolable material, then the CNT type can be changed, such as the CNT length. For example, longer CNTs can be useful in electrical/thermal applications, while shorter CNTs can be useful in mechanical strengthening applications.

In light of the aforementioned discussion regarding altering the properties of the fiber materials, the first type of CNT and the second type of CNT can be the same, in some embodiments, while the first type of CNT and the second type of CNT can be different, in other embodiments. Likewise, the first property and the second property can be the same, in some embodiments. For example, the EMI shielding property can be the property of interest addressed by the first amount and type of CNTs and the second amount and type of CNTs, but the degree of change in this property can be different, as reflected by differing amounts, and/or types of CNTs employed. Finally, in some embodiments, the first property and the second property can be different. Again, this can reflect a change in CNT type. For example, the first property can be mechanical strength with shorter CNTs, while the second property can be electrical/thermal properties with longer CNTs. One skilled in the art will recognize the ability to tailor the properties of the fiber material through the use of different CNT densities, CNT lengths, and the number of walls in the CNTs, such as single-walled, double-walled, and multi-walled, for example.

In some embodiments, a first amount of CNTs on a fiber material exhibits a group of properties that differs from a first group of properties exhibited by the fiber material itself That is, selecting an amount that can alter one or more properties of the fiber material, such as tensile strength. The first group of properties and second group of properties can include at least one of the same properties, thus representing enhancing an already existing property of the fiber material. In some embodiments, CNT infusion can impart a second group of properties to the CNT-infused fiber material that is not included among the first group of properties exhibited by the fiber material itself CNT-infused carbon and glass fiber materials have been described in Applicant's co-pending applications, U.S. Publication Nos. 2010/0279569 and 2010/0178825, both of which are incorporated herein by reference in their entirety. Such CNT-infused fiber materials are exemplary of the types that can be used as a reinforcing material in a tailored composite. Other CNT-infused fiber materials can include metal fibers, ceramic fibers, and organic fibers, such as aramid fibers. In the CNT-infusion processes disclosed in the above-referenced applications, fiber materials are modified to provide a layer (typically no more than a monolayer) of CNT-initiating catalyst nanoparticles on the fiber. The catalyst-laden fiber is then exposed to a CVD-based process used to grow CNTs continuously, in line. The CNTs grown are infused to the fiber material. The resultant CNT-infused fiber material is itself a composite architecture.

The CNT-infused fiber material can be tailored with specific types of CNTs on the surface of fiber material such that various properties can be achieved. For example, the electrical properties can be modified by applying various types, diameter, length, and density CNTs on the fiber. CNTs of a length that can provide proper CNT to CNT bridging are needed for percolation pathways that improve composite conductivity. Because fiber spacing is typically equivalent to or greater than one fiber diameter, from about 5 to about 50 microns, CNTs can be at least this length to achieve effective electrical pathways. Shorter length CNTs can be used to enhance structural properties.

In some embodiments, a CNT-infused fiber material includes CNTs of varying lengths along different sections of the same fiber material. When used as a tailored composite reinforcement, such multifunctional CNT-infused fiber materials enhance more than one property of the composite in which they are incorporated.

In some embodiments, a first amount of CNTs is infused to the fiber material. This amount is selected such that the value of at least one property selected from the group consisting of tensile strength, Young's Modulus, shear strength, shear modulus, toughness, compression strength, compression modulus, density, Electromagnetic wave absorptivity/reflectivity, acoustic transmittance, electrical conductivity, and thermal conductivity of the CNT-infused fiber material differs from the value of the same property of the fiber material itself. Any of these properties of the resultant CNT-infused fiber material can be imparted to the final composite.

Tensile strength can include three different measurements: 1) Yield strength which evaluates the stress at which material strain changes from elastic deformation to plastic deformation, causing the material to deform permanently; 2) Ultimate strength which evaluates the maximum stress a material can withstand when subjected to tension, compression or shearing; and 3) Breaking strength which evaluates the stress coordinate on a stress-strain curve at the point of rupture. Composite shear strength evaluates the stress at which a material fails when a load is applied perpendicular to the fiber direction. Compression strength evaluates the stress at which a material fails when a compressive load is applied.

MWNTs, in particular, have the highest tensile strength of any material yet measured, with a tensile strength of 63 GPa having been achieved. Moreover, theoretical calculations have indicated possible tensile strengths of CNTs of about 300 GPa. Thus, CNT-infused fiber materials are expected to have substantially higher ultimate strength compared to the parent fiber material. As described above, the increase in tensile strength will depend on the exact nature of the CNTs used as well as the density and distribution on the fiber material. CNT-infused fiber materials can exhibit a two to three times increase in tensile properties, for example. Exemplary CNT-infused fiber materials can have as high as three times the shear strength as the parent unfunctionalized fiber material and as high as 2.5 times the compression strength. Such increases in the strength of the reinforcing fiber material translate to increased strength in a composite in which the CNT-infused fiber material is incorporated.

Young's modulus is a measure of the stiffness of an isotropic elastic material. It is defined as the ratio of the uniaxial stress over the uniaxial strain in the range of stress in which Hooke's Law holds. This can be experimentally determined from the slope of a stress-strain curve created during tensile tests conducted on a sample of the material.

Electrical conductivity or specific conductance is a measure of a material's ability to conduct an electric current. CNTs with particular structural parameters such as the degree of twist, which relates to CNT chirality, can be highly conducting, thus exhibiting metallic properties. A recognized system of nomenclature (M. S. Dresselhaus, et al. Science of Fullerenes and CNTs, Academic Press, San Diego, Calif. pp. 756-760, (1996)) has been formalized and is recognized by those skilled in the art with respect to CNT chirality. Thus, for example, CNTs are distinguished from each other by a double index (n,m) where n and m are integers that describe the cut and wrapping of hexagonal graphite so that it makes a tube when it is wrapped onto the surface of a cylinder and the edges are sealed together. When the two indices are the same, m=n, the resultant tube is said to be of the "arm-chair" (or n,n) type, since when the tube is cut perpendicular to the CNT axis only the sides of the hexagons are exposed and their pattern around the periphery of the tube edge resembles the arm and seat of an arm chair repeated n times. Arm-chair CNTs, in particular single-walled CNTs (SWNTs), are metallic, and have extremely high electrical and thermal conductivity. In addition, such SWNTs have extremely high tensile strength.

In addition to the degree of twist, CNT diameter also effects electrical conductivity. As described above, CNT diameter can be controlled by use of controlled size CNT-forming catalyst nanoparticles. CNTs can also be formed as semi-conducting materials. Conductivity in MWNTs can be more complex. Interwall reactions within MWNTs can redistribute current over individual tubes non-uniformly. By contrast, there is no change in current across different parts of metallic SWNTs. CNTs also have very high thermal conductivity, comparable to diamond crystal and in-plane graphite sheet.

CNTs infused on the fibers can be any of a number of cylindrically-shaped allotropes of carbon of the fullerene family including SWNTs, DWNTs, and MWNTs. CNTs can be capped by a fullerene-like structure or open-ended. CNTs include those that encapsulate other materials.

As used herein, the term "air-based" means generally capable of being supported by air while in an operational state. Certain structures are considered air-based, but are also considered land-based, sea-based, or space-based. For example, a cargo container can be air-based, land-based, sea-based, and space-based and a water plane can be considered air-based and sea-based.

As used herein, the term "infused" means bonded and "infusion" means the process of bonding. Such bonding can involve direct covalent bonding, ionic bonding, pi-pi, and/or van der Waals force-mediated physiorption. For example, in some embodiments, the CNTs can be directly bonded to the fiber material. Bonding can be indirect, such as the CNT infusion to the fiber material via a barrier coating and/or an intervening transition metal nanoparticle disposed between the CNTs and fiber material. In the CNT-infused fiber materials disclosed herein, the CNTs can be "infused" to the fiber material directly or indirectly as described above. The particular manner in which a CNT is "infused" to a fiber material is referred to as a "bonding motif."

The CNTs infused on portions of the fiber material are generally uniform in length. As used herein "uniform in length" refers to length of CNTs grown in a reactor. "Uniform length" means that the CNTs have lengths with tolerances of plus or minus about 20% of the total CNT length or less, for CNT lengths varying from between about 1 micron to about 500 microns. At very short lengths, such as 1-4 microns, this error can be in a range from between about plus or minus 20% of the total CNT length up to about plus or minus 1 micron, that is, somewhat more than about 20% of the total CNT length.

The CNTs infused on portions of the fiber material are generally uniform in distribution as well. As used herein, "uniform in distribution" refers to the consistency of density of CNTs on a fiber material. "Uniform distribution" means that the CNTs have a density on the fiber material with tolerances of plus or minus about 10% coverage defined as the percentage of the surface area of the fiber covered by CNTs. This is equivalent to $\pm 1500$ CNTs/$\mu m^2$ for an 8 nm diameter CNT with 5 walls. Such a figure assumes the space inside the CNTs as fillable.

The present disclosure is directed, in part, to CNT-infused fiber materials. The infusion of CNTs to the fiber material can serve many functions including, for example, as a sizing agent to protect against damage from moisture, oxidation, abrasion, and compression. A CNT-based sizing can also serve as an interface between the fiber material and a matrix material in a composite. The CNTs can also serve as one of several sizing agents coating the fiber material.

Moreover, CNTs infused on a fiber material can alter various properties of the fiber material, such as thermal and/or electrical conductivity, and/or tensile strength, for example. The processes employed to make CNT-infused fiber materials provide CNTs with substantially uniform length and distribution to impart their useful properties uniformly over the fiber material that is being modified. Some such processes are suitable for the generation of CNT-infused fiber materials of spoolable dimensions.

The present disclosure is also directed, in part, to CNT-infused fiber materials. Various processes can be applied to nascent fiber materials generated de novo before, or in lieu of, application of a typical sizing solution to the fiber material. Alternatively, the processes can utilize a commercial fiber material, for example, a carbon tow, that already has a sizing applied to its surface. In such embodiments, the sizing can be removed to provide a direct interface between the fiber material and the synthesized CNTs, although a barrier coating and/or transition metal particle can serve as an intermediate layer providing indirect infusion, as explained further below. After CNT synthesis further sizing agents can be applied to the fiber material as desired.

Some processes allow for the continuous production of CNTs of uniform length and distribution along spoolable lengths of tow, tapes, fabrics, and other 3D woven structures. While various mats, woven and non-woven fabrics and the like can be functionalized by certain processes, it is also possible to generate such higher ordered structures from the parent tow, yarn or the like after CNT functionalization of these parent materials. For example, a CNT-infused woven fabric can be generated from a CNT-infused carbon fiber tow.

As used herein the term "fiber material" refers to any material that has filaments or bundles of filaments as its elementary structural component. The term encompasses fibers, filaments, yarns, tows, tapes, woven and non-woven fabrics, plies, mats, and the like.

As used herein the term "spoolable dimensions" refers to fiber materials having at least one dimension that is not limited in length, allowing the material to be stored on a spool or mandrel. Fiber materials of "spoolable dimensions" have at least one dimension that indicates the use of either batch or continuous processing for CNT infusion as described herein. One fiber material of spoolable dimensions that is commercially available is exemplified by AS4 12k carbon fiber tow with a tex value of 800 (1 tex =1 g/1,000m) or 620 yard/lb (Grafil, Inc., Sacramento, Calif.). Commercial carbon fiber tow, in particular, can be obtained in 5, 10, 20, 50, and 100 lb. (for spools having high weight, usually a 3 k/12K tow) spools, for example, although larger spools can require special order. Certain processes operate readily with 5 to 20 lb. spools, although larger spools are usable. Moreover, a pre-process operation can be incorporated that divides very large spoolable lengths, for example 100 lb. or more, into easy to handle dimensions, such as two 50 lb spools.

As used herein, the term "carbon nanotube" (CNT, plural CNTs) refers to any of a number of cylindrically-shaped allotropes of carbon of the fullerene family including single-walled carbon nanotubes (SWNTs), double-walled carbon nanotubes (DWNTs), multi-walled carbon nanotubes (MWNTs). Carbon nanotubes can be capped by a fullerene-like structure or open-ended. Carbon nanotubes include those that encapsulate other materials.

As used herein, the term "transition metal" refers to any element or alloy of elements in the d-block of the periodic table. The term "transition metal" also includes salt forms of the base transition metal element such as oxides, carbides, nitrides, and the like.

As used herein, the term "nanoparticle" or NP (plural NPs), or grammatical equivalents thereof refers to particles sized between about 0.1 to about 100 nanometers in equivalent spherical diameter, although the NPs need not be spherical in shape. Transition metal NPs, in particular, serve as catalysts for CNT growth on the fiber materials.

As used herein, the term "sizing agent," "fiber sizing agent," or just "sizing," refers collectively to materials used in the manufacture of fibers as a coating to protect the integrity of the fibers, provide enhanced interfacial interactions between a fiber and a matrix material in a composite, and/or alter and/or enhance particular physical properties of a fiber. In some embodiments, CNTs infused to fiber materials behave as a sizing agent.

As used herein, the term "matrix material" refers to a bulk material than can serve to organize sized CNT-infused fiber materials in particular orientations, including random orientation. The matrix material can benefit from the presence of the CNT-infused fiber material by imparting some aspects of the physical and/or chemical properties of the CNT-infused fiber material to the matrix material.

As used herein, the term "material residence time" refers to the amount of time a discrete point along a fiberous material of spoolable dimensions is exposed to CNT growth conditions during a CNT infusion process. This definition includes the residence time when employing multiple CNT growth chambers.

As used herein, the term "linespeed" refers to the speed at which a fiber material of spoolable dimensions can be fed through the CNT infusion process, where linespeed is a velocity determined by dividing CNT chamber(s) length by the material residence time.

In some embodiments, the present disclosure provides a composition that includes a CNT-infused fiber material. The CNT-infused fiber material includes a fiber material of spoolable dimensions, a barrier coating conformally disposed about the fiber material, and CNTs infused to the fiber material. The infusion of CNTs to the fiber material can include a bonding motif of direct bonding of individual CNTs to the fiber material or indirect bonding via a transition metal NP, barrier coating, or both.

Without being bound by theory, transition metal NPs, which serve as a CNT-forming catalyst, can catalyze CNT growth by forming a CNT growth seed structure. In one embodiment, the CNT-forming catalyst can remain at the base of the fiber material, locked by the barrier coating, and infused to the surface of the fiber material. In such a case, the seed structure initially formed by the transition metal nanoparticle catalyst is sufficient for continued non-catalyzed seeded CNT growth without allowing the catalyst to move along the leading edge of CNT growth, as often observed in the art. In such a case, the NP serves as a point of attachment for the CNT to the fiber material. The presence of the barrier coating can also lead to further indirect bonding motifs. For example, the CNT forming catalyst can be locked into the barrier coating, as described above, but not in surface contact with fiber material. In such a case, a stacked structure with the barrier coating disposed between the CNT forming catalyst and fiber material results. In either case, the CNTs formed are infused to the fiber material. In some embodiments, some barrier coatings will still allow the CNT growth catalyst to follow the leading edge of the growing nanotube. In such cases, this can result in direct bonding of the CNTs to the fiber material or, optionally, to the barrier coating. Regardless of the nature of the actual bonding motif formed between the CNTs and the fiber material, the infused CNT is robust and allows the CNT-infused fiber material to exhibit CNT properties and/or characteristics.

Again, without being bound by theory, when growing CNTs on fiber materials, the elevated temperatures and/or any residual oxygen and/or moisture that can be present in the reaction chamber can damage the fiber material. Moreover, the fiber material itself can be damaged by reaction with the CNT-forming catalyst itself. That is the fiber material can behave as a carbon feedstock to the catalyst at the reaction temperatures employed for CNT synthesis. Such excess carbon can disturb the controlled introduction of the carbon feedstock gas and can even serve to poison the catalyst by overloading it with carbon. The barrier coating employed in the present disclosure is designed to facilitate CNT synthesis on fiber materials. Without being bound by theory, the coating can provide a thermal barrier to heat degradation and/or can be a physical barrier preventing exposure of the fiber material to the environment at the elevated temperatures. Alternatively or additionally, it can minimize the surface area contact between the CNT-forming catalyst and the fiber material and/or it can mitigate the exposure of the fiber material to the CNT-forming catalyst at CNT growth temperatures.

Compositions having CNT-infused fiber materials are provided in which the CNTs are substantially uniform in length. In the continuous process, the residence time of the fiber material in a CNT growth chamber can be modulated to control CNT growth and ultimately, CNT length. This provides a means to control specific properties of the CNTs grown. CNT length can also be controlled through modulation of the carbon feedstock and carrier gas flow rates and reaction temperature. Additional control of the CNT properties can be obtained by controlling, for example, the size of the catalyst used to prepare the CNTs. For example, 1 nm transition metal nanoparticle catalysts can be used to provide SWNTs in particular. Larger catalysts can be used to prepare predominantly MWNTs.

Additionally, the CNT growth processes employed are useful for providing a CNT-infused fiber material with uniformly distributed CNTs on fiber materials while avoiding bundling and/or aggregation of the CNTs that can occur in processes in which pre-formed CNTs are suspended or dispersed in a solvent solution and applied by hand to the fiber material. Such aggregated CNTs tend to adhere weakly to a fiber material and the characteristic CNT properties are weakly expressed, if at all. In some embodiments, the maximum distribution density, expressed as percent coverage, that is, the surface area of fiber covered, can be as high as about 55% assuming about 8 nm diameter CNTs with 5 walls. This coverage is calculated by considering the space inside the CNTs as being "fillable" space. Various distribution/density values can be achieved by varying catalyst dispersion on the surface as well as controlling gas composition and process speed. Typically, for a given set of parameters, a percent coverage within about 10% can be achieved across a fiber surface. Higher density and shorter CNTs are useful for improving mechanical properties, while longer CNTs with lower density are useful for improving thermal and electrical properties, although increased density is still favorable. A lower density can result when longer CNTs are grown. This can be the result of the higher temperatures and more rapid growth causing lower catalyst particle yields.

The compositions of the disclosure having CNT-infused fiber materials can include a fiber material such as an individual filament, a fiber yarn, a fiber tow, a tape, a fiber-braid, a woven fabric, a non-woven fiber mat, a fiber ply, and other 3D woven structures. Filaments include high aspect ratio fibers having diameters ranging in size from between about 1 micron to about 100 microns. Fiber tows are generally compactly associated bundles of filaments and are usually twisted together to give yarns.

Yarns include closely associated bundles of twisted filaments. Each filament diameter in a yarn is relatively uniform. Yarns have varying weights described by their 'tex,' expressed as weight in grams of 1000 linear meters, or denier, expressed as weight in pounds of 10,000 yards, with a typical tex range usually being between about 200 tex to about 2000 tex.

Tows include loosely associated bundles of untwisted filaments. As in yarns, filament diameter in a tow is generally uniform. Tows also have varying weights and the tex range is usually between 200 tex and 2000 tex. They are frequently characterized by the number of thousands of filaments in the tow, for example 12K tow, 24K tow, 48K tow, and the like.

Tapes are materials that can be assembled as weaves or can represent non-woven flattened tows. Tapes can vary in width and are generally two-sided structures similar to ribbon. Process for formation can be compatible with CNT infusion on one or both sides of a tape. CNT-infused tapes can resemble a "carpet" or "forest" on a flat substrate surface. Again, such processes can be performed in a continuous mode to functionalize spools of tape.

Fiber-braids represent rope-like structures of densely packed fibers. Such structures can be assembled from yarns, for example. Braided structures can include a hollow portion or a braided structure can be assembled about another core material.

In some embodiments, a number of primary fiber material structures can be organized into fabric or sheet-like structures. These include, for example, woven fabrics, non-woven fiber mat, and fiber ply, in addition to the tapes described above. Such higher ordered structures can be assembled from parent tows, yarns, filaments or the like, with CNTs already infused in the parent fiber. Alternatively, such structures can serve as the substrate for the CNT infusion process.

There are three types of carbon fiber, which are categorized based on the precursors used to generate the fibers, any of which can be used in the disclosure: Rayon, Polyacrylonitrile (PAN) and Pitch. Carbon fiber from rayon precursors, which are cellulosic materials, has relatively low carbon content at about 20% and the fibers tend to have low strength and stiffness. Polyacrylonitrile (PAN) precursors provide a carbon fiber with a carbon content of about 55%. Carbon fiber based on a PAN precursor generally has a higher tensile strength than carbon fiber based on other carbon fiber precursors due to a minimum of surface defects.

Pitch precursors based on petroleum asphalt, coal tar, and polyvinyl chloride can also be used to produce carbon fiber. Although pitches are relatively low in cost and high in carbon yield, there can be issues of non-uniformity in a given batch.

CNTs useful for infusion to fiber materials include SWNTs, DWNTs, MWNTs, and mixtures thereof. The exact CNTs to be used depends on the application of the CNT-infused fiber material. CNTs can be used for thermal and/or electrical conductivity applications, or as insulators. In some embodiments, the infused CNTs are SWNTs. In some embodiments, the infused CNTs are MWNTs. In some embodiments, the infused CNTs are a combination of SWNTs and MWNTs. There are some differences in the characteristic properties of SWNTs and MWNTs that, for some end uses of the fiber, dictate the synthesis of one or the other type of nanotube. For example, SWNTs can be semi-conducting or metallic, while MWNTs are metallic.

CNTs lend their characteristic properties such as mechanical strength, low to moderate electrical resistivity, high thermal conductivity, and the like to the CNT-infused fiber material. For example, in some embodiments, the electrical resistivity of a CNT-infused fiber material is lower than the electrical resistivity of a parent fiber material. More generally, the extent to which the resulting CNT-infused fiber material expresses these characteristics can be a function of the extent and density of coverage of the fiber by the CNTs. Any amount of the fiber surface area, from 0-55% of the fiber can be covered assuming an 8 nm diameter, 5-walled MWNT (again, this calculation counts the space inside the CNTs as fillable). This number is lower for smaller diameter CNTs and more for greater diameter CNTs. 55% surface area coverage is equivalent to about 15,000 CNTs/$m^2$. Further CNT properties can be imparted to the fiber material in a manner dependent on CNT length, as described above. Infused CNTs can vary in length ranging from between about 1 micron to about 500 microns, including 1 micron, 2 microns, 3 microns, 4 micron, 5, microns, 6, microns, 7 microns, 8 microns, 9 microns, 10 microns, 15 microns, 20 microns, 25 microns, 30 microns, 35 microns, 40 microns, 45 microns, 50 microns, 60 microns, 70 microns, 80 microns, 90 microns, 100 microns, 150 microns, 200 microns, 250 microns, 300 microns, 350 microns, 400 microns, 450 microns, 500 microns, and all values in between. CNTs can also be less than about 1 micron in length, including about 0.5 microns, for example. CNTs can also be greater than 500 microns, including for example, 510 microns, 520 microns, 550 microns, 600 microns, 700 microns, and all values in between.

101001 Compositions of the disclosure can incorporate CNTs have a length from about 1 micron to about 10 microns. Such CNT lengths can be useful in application to increase shear strength. CNTs can also have a length from about 5 to about 70 microns. Such CNT lengths can be useful in applications for increased tensile strength if the CNTs are aligned in the fiber direction. CNTs can also have a length from about 10 microns to about 100 microns. Such CNT lengths can be useful to increase electrical/thermal properties as well as mechanical properties. CNTs can have a length from about 100 microns to about 500 microns, which can also be beneficial to increase electrical and thermal properties. Such control of CNT length is readily achieved through modulation of carbon feedstock and inert gas flow rates coupled with varying linespeeds and growth temperature.

In some embodiments, compositions that include spoolable lengths of CNT-infused fiber materials can have various uniform regions with different lengths of CNTs. For example, it can be desirable to have a first portion of CNT-infused fiber material with uniformly shorter CNT lengths to enhance shear strength properties, and a second portion of the same spoolable material with a uniform longer CNT length to enhance electrical or thermal properties.

Certain processes for CNT infusion to fiber materials allow control of the CNT lengths with uniformity and in a continuous process allowing spoolable fiber materials to be functionalized with CNTs at high rates. With material residence times between 5 to 300 seconds, linespeeds in a continuous process for a system that is 3 feet long can be in a range anywhere from about 0.5 ft/min to about 36 ft/min and greater. The speed selected depends on various parameters as explained further below.

In some embodiments, a material residence time of about 5 to about 30 seconds can produce CNTs having a length between about 1 micron and about 10 microns. In some embodiments, a material residence time of about 30 to about 180 seconds can produce CNTs having a length between about 10 microns to about 100 microns. In still further embodiments, a material residence time of about 180 to about 300 seconds can produce CNTs having a length between about 100 microns to about 500 microns. One skilled in the art will recognize that these ranges are approximate and that CNT length can also be modulated by reaction temperatures, and carrier and carbon feedstock concentrations and flow rates.

CNT-infused fiber materials of the disclosure include a barrier coating. Barrier coatings can include for example an alkoxysilane, methylsiloxane, an alumoxane, alumina nanoparticles, spin on glass and glass nanoparticles. As described below, the CNT-forming catalyst can be added to the uncured barrier coating material and then applied to the fiber material together. In other embodiments, the barrier coating material can be added to the fiber material prior to deposition of the CNT-forming catalyst. The barrier coating material can be of a thickness sufficiently thin to allow exposure of the CNT-forming catalyst to the carbon feedstock for subsequent CVD growth. In some embodiments, the thickness is less than or about equal to the effective diameter of the CNT-forming catalyst. In some embodiments, the thickness of the barrier coating is in a range from between about 10 nm to about 100 nm. The barrier coating can also be less than 10 nm, including 1 nm, 2 nm, 3nm, 4 nm, 5 nm, 6 nm, 7nm, 8nm, 9 nm, 10 nm, and any value in between.

Without being bound by theory, the barrier coating can serve as an intermediate layer between the fiber material and the CNTs and serves to mechanically infuse the CNTs to the fiber material. Such mechanical infusion still provides a robust system in which the fiber material serves as a platform for organizing the CNTs while still imparting properties of the CNTs to the fiber material. Moreover, the benefit of including a barrier coating is the immediate protection it provides the fiber material from chemical damage due to exposure to moisture and/or any thermal damage due to heating of the fiber material at the temperatures used to promote CNT growth.

The infused CNTs disclosed herein can effectively function as a replacement for conventional fiber "sizing." The infused CNTs are more robust than conventional sizing materials and can improve the fiber-to-matrix interface in composite materials and, more generally, improve fiber-to-fiber interfaces. Indeed, the CNT-infused fiber materials disclosed herein are themselves composite materials in the sense the CNT-infused fiber material properties will be a combination of those of the fiber material as well as those of the infused CNTs. Consequently, embodiments of the present disclosure provide a means to impart desired properties to a fiber material that otherwise lack such properties or possesses them in insufficient measure. Fiber materials can be tailored or engineered to meet the requirements of specific applications. The CNTs acting as sizing can protect fiber materials from absorbing moisture due to the hydrophobic CNT structure. Moreover, hydrophobic matrix materials, as further exemplified below, interact well with hydrophobic CNTs to provide improved fiber to matrix interactions.

Despite the beneficial properties imparted to a fiber material having infused CNTs described above, the compositions of the present disclosure can include further conventional sizing agents. Such sizing agents vary widely in type and function and include, for example, surfactants, anti-static agents, lubricants, siloxanes, alkoxysilanes, aminosilanes, silanes, silanols, polyvinyl alcohol, starch, and mixtures thereof. Such secondary sizing agents can be used to protect the CNTs themselves or provide further properties to the fiber not imparted by the presence of the infused CNTs.

Compositions of the present disclosure can further include a matrix material to form a composite with the CNT-infused fiber material. Such matrix materials can include, for example, an epoxy, a polyester, a vinylester, a polyetherimide, a polyetherketoneketone, a polyphthalamide, a polyetherketone, a polytheretherketone, a polyimide, a phenol-formaldehyde, and a bismaleimide. Matrix materials useful in the present disclosure can include any of the known matrix materials (see Mel M. Schwartz, Composite Materials Handbook (2d ed. 1992)). Matrix materials more generally can include resins (polymers), both thermosetting and thermoplastic, metals, ceramics, and cements.

Thermosetting resins useful as matrix materials include phthalic/maelic type polyesters, vinyl esters, epoxies, phenolics, cyanates, bismaleimides, and nadic end-capped polyimides (e.g., PMR-15). Thermoplastic resins include polysulfones, polyamides, polycarbonates, polyphenylene oxides, polysulfides, polyether ether ketones, polyether sulfones, polyamide-imides, polyetherimides, polyimides, polyarylates, and liquid crystalline polyester.

Metals useful as matrix materials include alloys of aluminum such as aluminum 6061, 2024, and 713 aluminum braze. Ceramics useful as matrix materials include carbon ceramics, such as lithium aluminosilicate, oxides such as alumina and mullite, nitrides such as silicon nitride, and carbides such as silicon carbide. Cements useful as matrix materials include carbide-base cermets (tungsten carbide, chromium carbide, and titanium carbide), refractory cements (tungsten-thoria and barium-carbonate-nickel), chromium-alumina, and nickel-magnesia iron-zirconium carbide. Any of the above-described matrix materials can be used alone or in combination.

Although the invention has been described with reference to the disclosed embodiments, those skilled in the art will readily appreciate that these only illustrative of the invention.

It should be understood that various modifications can be made without departing from the spirit of the invention.

What is claimed is:

1. An apparatus comprising:
    a structure configured to carry a load on an aircraft, the structure comprising:
        a first material comprising a plurality of carbon nanotubes (CNTs) that are bonded to substrate fibers thereby forming CNT-infused fibers that are distributed within a matrix material thereby imparting a first functionality to the structure, the first functionality selected from tensile strength, compressive strength, shear strength, and flexural strength; and
        a second material, different from the first material, the second material comprising CNT-infused fibers imparting a second functionality to the structure, the second functionality selected from damage sensing, de-icing, crack resistance, electromagnetic interference shielding, lightning strike protection, and radar absorption.

2. The apparatus of claim 1, wherein the CNT-infused fibers comprise CNTs grown on the fibers.

3. The apparatus of claim 1, wherein a CNT loading of the second material is between 0% and 2%.

4. The apparatus of claim 3, wherein the second functionality is damage sensing.

5. The apparatus of claim 1, wherein a CNT loading of the second material is between 2% and 5%.

6. The apparatus of claim 5, wherein the second functionality is de-icing.

7. The apparatus of claim 5, wherein the second functionality is crack resistance.

8. The apparatus of claim 1, wherein a CNT loading of the first material is between 5% and 40%.

9. The apparatus of claim 8, wherein the second functionality is electromagnetic interference shielding.

10. The apparatus of claim 8, wherein the second functionality is lightning strike protection.

11. The apparatus of claim 1, wherein a CNT loading of the second material is a gradient.

12. The apparatus of claim 11, wherein the second functionality is radar absorption.

13. The apparatus of claim 1, wherein the structure is a fuselage.

14. The apparatus of claim 13, wherein the fuselage comprises:
    one or more panels comprising the first material wherein the first functionality comprises tensile strength;
    an outer layer over the one or more panels and comprising the second material wherein the second functionality comprises electromagnetic interference shielding and lightning strike protection;
    a skin over the outer layer and comprising a third material comprising CNT-infused fibers with a CNT loading between 0% and 2%, imparting a functionality of damage sensing; and
    a middle layer disposed between the skin and the one or more panels and comprising a fourth material comprising CNT-infused fibers with a CNT loading, imparting a functionality of de-icing.

15. The apparatus of claim 1, wherein the structure is a nose cone.

16. The apparatus of claim 1, wherein the structure is an aircraft wing.

17. The apparatus of claim 1, wherein the structure is a propeller.

18. The apparatus of claim 1, wherein the structure is a helicopter rotor blade.

19. The apparatus of claim 1, wherein the structure is a portion of an aircraft engine.

20. The apparatus of claim 1, wherein the structure is a portion of a weather balloon instrument.

21. A method comprising:
    providing a load-carrying structure for use with an aircraft, the structure comprising:
        a first material comprising a plurality of carbon nanotubes (CNTs) that are bonded to substrate fibers thereby forming CNT-infused fibers that are distributed within a matrix material thereby imparting a first functionality to the structure, the first functionality selected from tensile strength, compressive strength, shear strength, and flexural strength; and
        a second material different from the first material, the second material comprising CNT-infused fibers imparting a second functionality to the structure, the second functionality selected from damage sensing, de-icing, crack resistance, electromagnetic interference shielding, lightning strike protection, and radar absorption.

22. The method of claim 21, wherein the first material and the second material overlap.

23. The method of claim 21, further comprising:
    determining the first functionality; and
    selecting a CNT loading of the first material based on the first functionality.

24. The method of claim 21, further comprising:
    determining the second functionality; and
    selecting a CNT loading of the second material based on the second functionality.

* * * * *